US012588584B2

(12) United States Patent
Sabzevari

(10) Patent No.: US 12,588,584 B2
(45) Date of Patent: Mar. 31, 2026

(54) ROBOT AND METHOD FOR ASCERTAINING A DISTANCE TRAVELED BY A ROBOT

(71) Applicant: Robert Bosch GmbH, Stuttgart (DE)

(72) Inventor: Reza Sabzevari, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 427 days.

(21) Appl. No.: 18/001,150

(22) PCT Filed: Jul. 15, 2021

(86) PCT No.: PCT/EP2021/069819
§ 371 (c)(1),
(2) Date: Dec. 8, 2022

(87) PCT Pub. No.: WO2022/048820
PCT Pub. Date: Mar. 10, 2022

(65) Prior Publication Data
US 2023/0210048 A1 Jul. 6, 2023

(30) Foreign Application Priority Data

Sep. 4, 2020 (DE) ..................... 10 2020 211 167.7

(51) Int. Cl.
*A01D 34/00* (2006.01)
*B64U 50/19* (2023.01)
(Continued)

(52) U.S. Cl.
CPC ........... *A01D 34/008* (2013.01); *B64U 50/19* (2023.01); *G05D 1/0253* (2013.01);
(Continued)

(58) Field of Classification Search
None
See application file for complete search history.

(56) References Cited

U.S. PATENT DOCUMENTS

2017/0347624 A1* 12/2017 Jorgensen .............. G05D 1/027
2020/0192388 A1* 6/2020 Zhang ................... G05D 1/648

FOREIGN PATENT DOCUMENTS

DE 19521358 C1 9/1996
WO WO-2004059900 A2 * 7/2004 ............... G06T 7/55

OTHER PUBLICATIONS

International Search Report for PCT/EP2021/069819, Issued Oct. 7, 2021.

(Continued)

*Primary Examiner* — Claude J Brown
(74) *Attorney, Agent, or Firm* — NORTON ROSE FULBRIGHT US LLP

(57) ABSTRACT
A semiautonomous robot. The robot includes at least two powered locomotion devices and a monocular capture unit. The at least two locomotion devices are designed to rotate at least the capture unit about a rotational axis, which is situated in a fixed position relative to the capture unit, the capture unit and the rotational axis being set apart from each other. The robot further includes at least one control and/or regulating unit for ascertaining a distance traveled. As a function of a movement of the capture unit about the rotational axis fixed during the movement, in particular, at a known distance from the rotational axis and/or in a known orientation relative to the rotational axis, the control and/or regulating unit is configured to determine a distance conversion parameter, which is provided for ascertaining the distance traveled.

18 Claims, 10 Drawing Sheets

(51) Int. Cl.
    G05D 1/00           (2006.01)
    *A01D 101/00*      (2006.01)
    *B64U 101/30*      (2023.01)

(52) U.S. Cl.
    CPC ....... G05D 1/0272 (2013.01); *A01D 2101/00*
                (2013.01); *B64U 2101/30* (2023.01)

(56)            References Cited

OTHER PUBLICATIONS

Scaramuzza, "1-Point-Ransac Structure From Motion for Vehicle-Mounted Cameras By Exploiting Non-Holonomic Constraints," International Journal of Computer Vision, Kluwer Academic Publishers, BO, vol. 95, No. 1, 2011, pp. 74-85. <https://rpg.ifi.uzh.ch/docs/IJCV11_scaramuzza.pdf> Downloaded Dec. 6, 2022.

Sabzevari et al., "Multi-Body Motion Estimation From Monocular Vehicle-Mounted Cameras," IEEE Transactions on Robotics, IEEE Service Center, vol. 32, No. 3, 2016, pp. 1-14. <https://rpg.ifi.uzh.ch/docs/TRO16_sabzevari.pdf> Downloaded Dec. 6, 2022.

* cited by examiner

Fig. 4

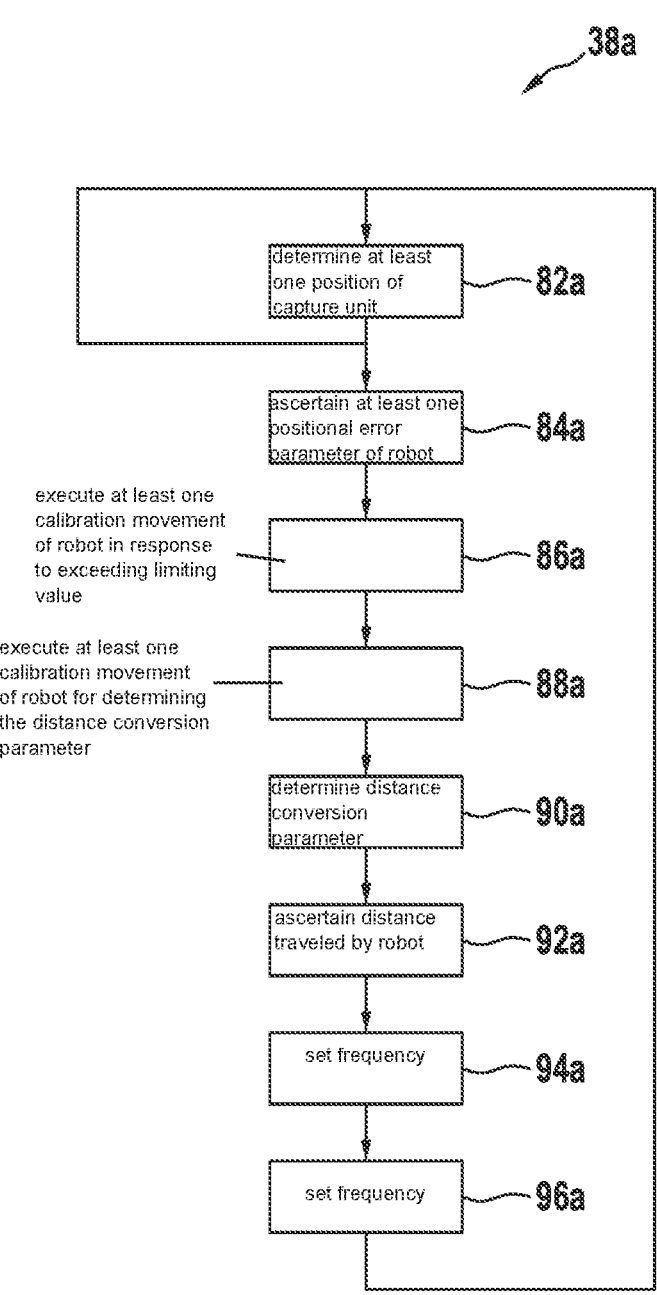

38a determine at least one position of capture unit — 82a ascertain at least one positional error parameter of robot — 84a execute at least one calibration movement of robot in response to exceeding limiting value 86a execute at least one calibration movement of robot for determining the distance conversion parameter 88a determine distance conversion parameter — 90a ascertain distance traveled by robot — 92a set frequency — 94a set frequency — 96a

ROBOT AND METHOD FOR ASCERTAINING A DISTANCE TRAVELED BY A ROBOT

FIELD

A robot having at least two powered locomotion devices; having a capture unit, where the at least two locomotion devices are designed to rotate at least the capture unit about a rotational axis, which is situated in a fixed position relative to the capture unit, and the capture unit and the rotational axis are set apart from each other; and having at least one control and/or regulating unit for ascertaining a distance traveled.

SUMMARY

The present invention starts out from a robot, in particular, a semiautonomous robot, including at least two powered locomotion devices, in particular, wheels; including a, in particular, monocular capture unit, where the at least two locomotion devices are designed to rotate at least the capture unit about a rotational axis, which is situated in a fixed position relative to the capture unit, and the capture unit and the rotational axis are set apart from each other; and including at least one control and/or regulating unit for ascertaining a distance traveled.

The control and/or regulating unit is configured to determine a distance conversion parameter, which is provided for ascertaining the distance traveled, as a function of a movement of the capture unit about the rotational axis fixed during the movement, in particular, at a known distance from the rotational axis and/or in a known orientation relative to the rotational axis.

In particular, "configured" is to be understood as specially programmed, specially designed and/or specially equipped. That an object, in particular, the control and/or regulating unit, is configured for a particular function, in particular, a determination of the distance conversion parameter, is to be understood to mean, in particular, that the object fulfills and/or executes this particular function in at least one application state and/or operating state. A "control and/or regulating unit" is to be understood as, in particular, a unit having at least one piece of control electronics. "Control electronics" are to be understood as, in particular, a unit including a processor unit taking the form of, for example, a processor, an FPGA, a microcontroller, or the like; and including a storage unit taking the form of, for example, an electronic data storage unit, physical storage unit, or the like; as well as including an operating program stored in the storage unit. The control and/or regulating unit preferably includes at least one algorithm for determining the distance conversion parameter and for ascertaining the distance traveled by the robot as a function of the determined distance conversion parameter. In particular, the algorithm is stored in the control and/or regulating unit, in particular, in the storage unit of the control and/or regulating unit. That the rotational axis is configured to be "fixed during the movement," is to be understood to mean, in particular, that during/for a determination of the distance conversion parameter, the robot moves in such a manner, that the rotational axis remains at least substantially stationary relative to an area surrounding the robot during the movement. In particular, during/for the determination of the distance conversion parameter, at least the capture unit is at a constant, in particular, known, distance from the rotational axis. During/for the determination of the distance conversion parameter, the capture unit is preferably designed to be moved about the rotational axis; in particular, an orientation of a capture range of the capture unit being rotated along, as well. "Designed" is to be understood as, in particular, specially configured and/or specially equipped. That an object is designed for a particular function, is to be understood to mean, in particular, that the object fulfills and/or executes this particular function in at least one application state and/or operating state. The control and/or regulating unit is preferably configured to ascertain the distance traveled by the robot, in particular, periodically or continuously, as a function of the distance conversion parameter. It is particularly preferable for the control and/or regulating unit to be configured to determine the distance conversion parameter during a calibration movement of the robot, in particular, during normal operation of the robot, and/or to produce a calibration movement, in particular, using a steering and/or drive unit of the robot, for determining the distance conversion parameter.

A "distance conversion parameter" is to be understood, in particular, as a parameter, which is provided for converting a quantity, in particular, a distance, interval, and/or a range measured in an arbitrary unit, to a metric unit, in particular, meters. It is particularly preferable for the distance conversion parameter to be provided for converting a quantity measured by the capture unit and/or a quantity ascertained from images acquired by the capture unit, which describes, in particular, a distance, an interval, and/or a range, to meters. The distance conversion parameter preferably takes the form of a minimum distance in space, in particular, in a plane of motion, from a position of the capture unit prior to the movement of the capture unit about the rotational axis fixed during the movement, to a position after the movement of the capture unit. In particular, a placement of the capture unit relative to the fixed rotational axis, which is situated, in particular, in the fixed position relative to the capture unit, is known and stored in the control and/or regulating unit. The control and/or regulating unit is preferably configured to determine the distance conversion parameter as a function of the stored placement of the capture unit relative to the fixed rotational axis and an angle of rotation moved through about the rotational axis during the movement about the rotational axis fixed during the movement. In particular, the distance conversion parameter is determined during a movement within a plane, which is oriented at least substantially perpendicularly to the rotational axis. "Substantially perpendicular" is to be understood, in particular, as an orientation of a straight line, a plane, or a direction, in particular, of the plane, relative to another straight line, another plane, or a reference direction, in particular, of the rotational axis; in particular, viewed in a projection plane, the straight line, the plane, or the direction, and the other straight line, the other plane, or the reference direction, forming an angle of 90°, and the angle having a maximum deviation of, in particular, less than 8°, advantageously, less than 5°, and particularly advantageously, less than 2°.

The robot is preferably designed to be semiautonomous or fully autonomous. In normal operation, in particular, the robot is preferably intended for a certain action, such as vacuuming a surface, mowing plants, in particular, grass, monitoring a region, transporting goods, such as packages or containers, or the like; in particular, the robot being designed to execute the action during and/or between a determination of the distance conversion parameter. A "semiautonomous robot" is to be understood, in particular, as a robot, in particular, the robot mentioned above, which performs an action independently in an operating state; electronics controlling the robot and software executed by the electronics taking the form of part of the robot. A "fully autonomous" robot is to be understood, in particular, as a semiautonomous robot, which includes a power supply of its own and is able to perform an action at least essentially endlessly, independently of external devices and/or a user. The at least two powered locomotion devices take the form, for example, of wheels, friction rollers for caterpillar tracks, in particular, as part of a chain drive, as feet or stilts, as rotors, or the like. In particular, the robot is designed to be mobile and/or able to fly. In particular, the capture unit is intended for acquiring images. Preferably, exactly only one image at a time may be acquired by the capture unit. A "monocular capture unit" is to be understood as, in particular, a capture unit, which is provided for viewing an object and/or a surrounding area with the aid of only a single eye. The capture unit preferably includes exactly one capture element. In particular, the capture element takes the form of a, in particular, monocular, camera. The capture element is preferably set apart from the rotational axis. It is particularly preferable for the capture unit, in particular, the capture element, to be positioned in a projection plane oriented at least substantially perpendicularly to the rotational axis, set apart from the rotational axis. The capture unit, in particular, the capture element, is preferably situated at least partially on an outer side of the robot, in particular, on a housing of the robot. In particular, the capture unit, in particular, the capture element, is designed and/or situated in such a manner, that at least part of an area surrounding the robot may be covered by the capture unit, in particular, the capture element. The capture unit, in particular, the capture element, preferably has a detection range and a main viewing direction. In order to determine the distance conversion parameter, the capture range and the main viewing direction are moved along and/or rotated during a movement about the rotational axis. In particular, a rotation of the capture unit about the rotational axis for determining the distance conversion parameter takes the form of a controlled rotation. It is particularly preferable for the capture unit, in particular, the capture element, to be designed to cover the area surrounding the robot and/or objects in the area surrounding the robot. The capture unit and/or the control and/or regulating unit is/are preferably configured for machine vision; in particular, the area surrounding the robot and/or objects in the area surrounding the robot being recognizable and digitally detectable. The control and/or regulating unit is preferably configured to ascertain two pixels corresponding, in particular, with regard to an association with a viewed object or with regard to a position within the surrounding area, in at least two images, which are acquired by the capture unit, in particular, by the capture element, and are offset temporally from each other. The capture unit and/or the control and/or regulating unit is/are preferably designed and/or configured to recognize an optical flow between two recorded images.

The rotational axis preferably runs through the robot. However, it is also possible for the rotational axis to be situated completely outside of the robot. In particular, at least a distance of the capture unit from the rotational axis in the plane/projection plane positioned at least substantially perpendicularly to the rotational axis is stored in the control and/or regulating unit. The orientation of the capture unit relative to the rotational axis is preferably given by the main viewing direction and/or the detection range of the capture unit. During the movement of the capture unit about the rotational axis fixed during the movement, for determining the distance conversion parameter, in particular, an angle of rotation of the main viewing direction and/or of the capture range of the capture unit corresponds to an angle of rotation, by which the capture unit is moved about the rotational axis during this movement.

According to an example embodiment of the present invention, the capture unit and the control and/or regulating unit are preferably intended for a method to simultaneously determine position and generate a map (SLAM method). In particular, the control and/or regulating unit is configured to generate a three-dimensional trajectory of the robot as a function of the ascertained distance traveled and a starting position of operation of the robot. The control and/or regulating unit is preferably configured to generate a, in particular, three-dimensional, virtual map of an area surrounding the robot, as a function of the ascertained distance traveled and a starting position of operation of the robot and/or of the generated three-dimensional trajectory of the robot; the surrounding area being made up of, in particular, a surface traveled over or flown over by the robot. In particular, the control and/or regulating unit is configured to ascertain a position and an orientation of the robot, in particular, of the capture unit, in the virtual map. It is possible for the control and/or regulating unit to be configured to indicate the virtual map, in particular, via an output unit, such as a display, of the robot, or via a communications unit of the robot, on an external unit, and/or to output it to a user.

It is possible for the robot to include at least one sensor unit, which is provided for measuring at least one surrounding-area parameter. The sensor unit preferably includes at least one sensor element. For example, the sensor element takes the form of a rain sensor, an odometric sensor, a position-determining sensor such as a GPS sensor or the like, a further camera, a proximity sensor, a distance sensor, an inertial sensor, or the like. Using, in particular, the distance conversion parameter, the monocular capture unit and the control and/or regulating unit are preferably designed and/or configured to ascertain the distance traveled by the robot, independently of the sensor unit and/or independently of data acquired by the sensor unit. It is possible for the control and/or regulating unit to be configured to utilize measured surrounding-area parameters for generating the three-dimensional trajectory of the robot and/or the virtual map.

The design of the robot according to the present invention may advantageously allow the distance traveled by the robot to be determined accurately and directly, in particular, independently of odometry. Low manufacturing costs are advantageously possible, in particular, since additional sensors for ascertaining the distance traveled by the robot may be omitted. In this manner, an advantageously compact design may be rendered possible. An advantageously flexible design of a drive system of the robot may be enabled. Advantageously accurate monitoring and localization of the robot may be rendered possible. In particular, the distance traveled by the robot may be ascertained without odometry, even in the case of robots movable from a surface, and/or movable indirectly via the propulsion of mobile robots, such as flying, suspended, or floating robots. A "surrounding-area parameter" is to be understood, in particular, as a parameter, which describes an area surrounding the robot. For example, the surrounding-area parameter takes the form of a visual range, a state of rain of the surrounding area, a dampness of the surrounding air or of a surface, a temperature, or the like. A frame-to frame evaluation of recorded images via the distance conversion parameter may advantageously be used for a scene-to-frame evaluation; in particular, the distance traveled by the robot being able to be ascertained metrically.

In addition, according to an example embodiment of the present invention, it is provided that the at least two powered locomotion devices be positioned coaxially to each other and be capable of being driven differentially; in particular, the rotational axis intersecting a common axis of rotation of the two locomotion devices at least substantially at one point, in particular, a midpoint of the axis of rotation, and being positioned, in particular, at least substantially perpendicularly to a horizontal, in particular, to the plane/projection plane. An advantageously simple and cost-effective design of the robot may be enabled. A placement of the capture unit set apart from the rotational axis may be ensured in an advantageously simple manner. The locomotion devices, which are positioned coaxially to each other and may be driven differentially, preferably take the form of wheels or friction rollers for chains, in particular, caterpillar tracks. In particular, in one embodiment of the locomotion devices as friction rollers of a chain drive, the caterpillar tracks, in particular, planes, in which the individual caterpillar tracks move, are positioned at least substantially parallelly to each other. The rotational axis is preferably positioned at least substantially perpendicularly to the axis of rotation of the locomotion devices. The capture unit, in particular, the capture element, is preferably positioned in a plane oriented at least substantially parallelly to the axis of rotation and at least substantially perpendicularly to the rotational axis. It is possible for the capture unit, in particular, the capture element, to be situated on the axis of rotation or to be set apart from the axis of rotation. "Capable of being driven differentially" is to be understood, in particular, to mean that the at least two locomotion devices are capable of being driven independently of each other, in particular, by a different torque. Preferably, the at least two locomotion devices may be driven in such a manner, that they move about the axis of rotation in directions different from each other. The at least two locomotion devices are preferably designed to move, in particular, to rotate the capture unit about the axis of rotation, which intersects the rotational axis at the midpoint of the axis of rotation and is positioned at least substantially perpendicularly to the axis of rotation. It is possible for the robot to include more that two locomotion devices. In addition, it is possible for the robot to include more that two powered locomotion devices.

In addition, according to an example embodiment of the present invention, it is provided that the robot include at least one, in particular, the above-mentioned steering and/or drive unit, for moving the robot; the control and/or regulating unit being configured to set at least one steering and/or drive parameter of the steering and/or drive unit, in order to determine the distance conversion parameter, in particular, to carry out a calibration movement. A need-based and/or situation-specific determination of the distance conversion parameter may be advantageously enabled; in particular, it being able to be ensured that the distance conversion parameter is determined under conditions suitable for movement of the capture unit during the determination. An advantageously uniform accuracy of a determination of the distance traveled by the robot may be rendered possible, in particular, since a determination of the distance conversion parameter at regular intervals via direct control of the robot may be ensured. A "steering and/or drive parameter" is to be understood, in particular, as a parameter, which influences the steering and/or drive unit of the robot for moving the robot. In particular, the steering and/or drive parameter is provided for setting a steering angle of the robot, in particular, of a steering device of the robot, and/or for setting a motive force of at least one of the powered locomotion devices. In particular, the steering device takes the form of a further locomotion device, which is rotatable, in particular, about a steering axis. The further locomotion device may preferably be movable about the steering axis to a steering angle. The steering axis of the further locomotion device is preferably oriented at least substantially perpendicularly to the axis of rotation of the at least two locomotion devices and/or at least substantially parallelly to the rotational axis. "Substantially parallel" is to be understood, in particular, as an orientation of a straight line, a plane, or a direction, in particular, of the steering axis, relative to another straight line, another plane, or a reference direction, in particular, of the rotational axis; the straight line, the plane, or the direction deviating from the other straight line, the other plane, or the reference direction by, in particular, less than 8°, advantageously, less than 5°, and particularly advantageously, less than 2°. It is also possible for the at least two powered locomotion devices or one of the powered locomotion devices to take the form of steering devices and to be movable so as to be propelled about a steering axis for steering the robot. For example, in one embodiment of the powered locomotion devices in the form of rotors, it is possible for the powered locomotion devices to be movable together or individually so as to be propelled about a steering axis, which is, in particular, different from an axis of rotation of the rotors/of the specific rotor. The steering and/or drive unit preferably includes at least one motor for powering the locomotion devices. For example, the at least one motor takes the form of an electric motor or another conventional motor. It is possible for the powered locomotion devices to each be powered individually by a motor of the steering and/or drive unit, or for, in each instance, at least two powered locomotion devices of the robot positioned coaxially to each other to be powered by a motor of the steering and/or drive unit. In particular, the powered locomotion devices of the robot take the form of part of the steering and/or drive unit. Using the steering and/or drive parameter, the control and/or regulating unit is preferably configured to set at least an orientation of the at least one steering device relative to the steering axis of the steering device, in particular, in order to steer the robot. The control and/or regulating unit is preferably configured to set at least one motive force of the at least one motor of the steering and/or drive unit, which is to be applied to a locomotion device, using the steering and/or drive parameter. It is particularly preferable for the control and/or regulating unit to be configured to execute a calibration movement of the robot, using the steering and/or drive parameter. In particular, the control and/or regulating unit is configured to determine the distance conversion parameter during the calibration movement of the robot. The calibration movement of the robot preferably takes the form of a/the movement of the capture unit about the rotational axis fixed during the movement; during the calibration movement, the capture unit being at a constant and known distance from the rotational axis. During the calibration movement, the capture unit is preferably designed to be moved about the rotational axis at the known distance and in the known orientation relative to the rotational axis, within a plane, which is oriented, in particular, at least substantially perpendicularly to the rotational axis and/or at least substantially parallelly to an undersurface of the robot. In particular, the/a calibration movement is independent of an orientation of the capture unit; with the exception of the rotation about the rotational axis, the orientation of the capture unit preferably not changing during the movement about the rotational axis. For example, it is possible to determine the distance conversion parameter during a calibration movement; the capture range and/or the main viewing direction of the capture unit being oriented, for example, upwards, at least substantially parallelly to the rotational axis, or having another orientation directed out of a plane of the calibration movement, in which the capture unit moves during the calibration movement.

In addition, according to an example embodiment of the present invention, it is provided that the control and/or regulating unit be configured to ascertain a, in particular, view-specific distance parameter with the aid of an evaluation of two images recorded temporally offset from each other, by the capture unit, and to scale the ascertained distance parameter over the determined distance conversion parameter, in order to ascertain the distance traveled, in particular, between two capture times of the two images. The distance traveled by the robot may be ascertained in an advantageously simple and rapid manner. An advantageously simple and cost-effective design of the control and/or regulating unit may be rendered possible, in particular, since due to the scaling of the ascertained distance parameters, computationally intensive operations may be advantageously omitted, and therefore, an advantageously low computing power is needed. This renders advantageously low manufacturing costs possible. In particular, during operation of the robot, the capture unit, in particular, the capture element, is preferably designed to record images periodically or continuously, in particular, at a frequency of at least 5 Hz, preferably, at least 10 Hz, preferentially, at least 30 Hz, and, particularly preferentially, at least 60 Hz. In particular, using a method of epipolar geometry, the control and/or regulating unit is preferably configured to ascertain, over two images recorded temporally offset from each other, a distance parameter taking the form of a distance traveled by the robot in a time interval between the two images. It is also possible for the distance parameter to take the form of a dimension of an object detected by the capture unit, a distance from a detected object, a distance between two detected objects, or the like. In particular, the distance parameter is designed to be dimensionless, or its unit is an arbitrary unit different from a metric unit. It is particularly preferable for the distance conversion parameter to be provided for converting the distance parameter to a metric unit, in particular, to meters, and/or for scaling it. The control and/or regulating unit is preferably configured to ascertain at least one distance parameter for each time interval between two images recorded by the capture unit. However, it is also possible for the control and/or regulating unit to be configured to ascertain at least one distance parameter for only a portion of the recorded images; in particular, a time interval extending over a plurality of recorded images for ascertaining the time interval. For example, the control and/or regulating unit is configured to utilize every second recorded image for ascertaining a distance parameter; in each instance, a distance parameter preferably being ascertained from a comparison between a recorded image and a recorded image after the next recorded image. In particular, the control and/or regulating unit is configured to ascertain at least one distance parameter, the distance conversion parameter and/or the distance traveled by the robot, at a frequency of at least 5 Hz, preferably, at least 15 Hz, and, especially, at least 30 Hz. In particular, a frequency of the control and/or regulating unit for ascertaining the distance parameter, in particular, the angle of rotation, for determining the distance conversion parameter, and/or for ascertaining the distance traveled by the robot is, depending on the hardware, not more than 360 Hz, preferably, not more than 200 Hz, and, especially, not more than 120 Hz. In response to a movement of the capture unit, in particular, the capture element, about the rotational axis fixed during the movement, in particular, at a known distance from the rotational axis and/or in a known orientation relative to the rotational axis, a dimensionless value or value present in the arbitrary unit different from a metric unit, of a distance traveled by the capture unit, in particular, the capture element, is stored in the control and/or regulating unit as a function of an angle of rotation about the rotational axis moved through by the capture unit, in particular, by the capture element. In response to a movement of the capture unit, in particular, the capture element, about the rotational axis fixed during the movement, in particular, at a known distance from the rotational axis and/or in a known orientation relative to the rotational axis, it is also possible for the control and/or regulating unit to be configured to ascertain a dimensionless value or value present in the arbitrary unit different from a metric unit, of a distance traveled by the capture unit, in particular, by the capture element, as a function of an angle of rotation moved through during the movement about the rotational axis by the capture unit, in particular, the capture element. With the aid of an image recorded, in particular, by the capture unit, prior to the movement of the capture unit about the rotational axis fixed during the movement, and an image recorded, in particular, by the capture unit, after the movement of the capture unit about the rotational axis fixed during the movement, it is particularly preferable for the control and/or regulating unit to be configured to ascertain the angle of rotation covered by the capture unit, in particular, the capture element, during the movement about the rotational axis, in particular, with the aid of a method of epipolar geometry. In particular, with the aid of the algorithm, the control and/or regulating unit is configured, in particular, to determine the distance conversion parameter from images recorded by the capture unit and/or to ascertain the distance traveled by the robot and/or a distance parameter, in particular, the angle of rotation, while images and/or a further image is/are recorded with the aid of the capture unit. In particular, with the aid of the algorithm, the control and/or regulating unit is preferably configured to determine the distance conversion parameter and/or to ascertain the distance traveled by the robot and/or a distance parameter, in particular, the angle of rotation, until/before a further image provided for determining the distance conversion parameter, for ascertaining the distance traveled by the robot, and/or for ascertaining a distance parameter, in particular, the angle of rotation, is recorded and transmitted, in particular, to the control and/or regulating unit. For example, a time interval between two recorded images utilized for ascertaining the distance parameter, in particular, the angle of rotation, for determining the distance conversion parameter, and/or for ascertaining the distance traveled by the robot, is at least 1 ms, preferably, at least 2 ms, and, especially, at least 3 ms, and/or at most, 30 ms, preferably, not more than 20 ms, and, especially, not more than 10 ms. In particular, the control and/or regulating unit is configured to utilize a portion of the, in particular, every second, image(s) recorded by the capture unit, in order to ascertain the distance parameter, in particular, the angle of rotation, determine the distance conversion parameter, and/or ascertain the distance traveled by the robot.

In addition, according to an example embodiment of the present invention, it is provided that the control and/or regulating unit include at least one, in particular, the above-mentioned algorithm for determining the distance conversion parameter, and be configured to execute the algorithm continuously or periodically, in particular, during normal operation of the robot. Advantageously automatic determination of the distance conversion parameter during normal operation of the robot may be rendered possible. Due to this, dedicated calibration movements may be advantageously omitted for the determination of the distance conversion parameter. An advantageously high efficiency of the robot during an action in normal operation may be enabled, for example, during suction operation, mowing operation, monitoring, or the like. An advantageously high accuracy of a determination of the distance traveled by the robot may be rendered possible, in particular, since an advantageously frequent determination of the distance conversion parameter for ascertaining the distance traveled by the robot may take place as a function of a working range of the robot and/or a movement pattern of the robot during normal operation. In particular, the algorithm is designed for ascertaining the distance traveled by the robot as a function of the determined distance conversion parameter. The control and/or regulation unit is preferably configured to ascertain a movement performed by the robot in a time interval between two recorded images intended for a determination of the distance conversion parameter, in particular to ascertain a distance traveled and/or a rotation of the robot, preferably, with the aid of a method of epipolar geometry, over the two images. It is particularly preferable for the control and/or regulating unit to be configured to determine the distance conversion parameter with the aid of the two images, if the ascertained movement of the robot executed within the time interval, in particular, the distance traveled and/or the rotation of the robot, is at least within an extreme range of movement. In particular, the extreme range of movement includes at least an extreme range for a translational movement of the robot, in particular, of the capture unit and/or the capture element, at least an extreme range for a rotation of the capture unit, in particular, of the capture element, about the rotational axis, and/or at least an extreme range for a deviation of a trajectory of the movement of the robot from a, in particular, horizontal, plane. In particular, the extreme range for a translational movement of the robot, in particular, of the capture unit and/or the capture element, corresponds to a distance between 0 cm and not more than 2 cm, preferably, between 0 cm and not more than 1 cm, and, especially, between 0 cm and not more than 0.5 cm. The control and/or regulating unit is preferably configured to ascertain the movement of the robot, in particular, the translational movement, the rotation, and/or the deviation of the trajectory of the movement of the robot from the plane, with the aid of a distance conversion parameter determined beforehand/in the past, with the aid of a method of epipolar geometry, from the captured images, and/or with the aid of a measured movement parameter of another sensor element of the sensor unit. The control and/or regulating unit is particularly preferably configured to execute the algorithm during normal operation of the robot; in particular, the distance conversion parameter being determined continuously or periodically, if a movement of the robot, which takes place within a time interval considered for determining the distance conversion parameter, lies within the extreme range of movement. For example, the control and/or regulating unit is configured to discontinue a determination of the distance conversion parameter and/or to disregard a determined distance conversion parameter, in particular, for ascertaining the distance traveled by the robot, if the movement of the robot exceeds the extreme range of movement, in particular, does not execute any rotation about the fixed rotational axis, and/or the movement deviates from a plane by more than 7°, preferably, more than 5°, and especially, more than 3°.

In addition, the present invention provides a method for ascertaining a, in particular, the above-mentioned, distance traveled by a robot, in particular, a semiautonomous robot, in particular, of a robot of the present invention; the robot including at least two powered locomotion devices, in particular, wheels, and a, in particular, monocular, capture unit; the at least two locomotion devices being designed to rotate the capture unit about an, in particular, the above-mentioned, rotational axis, which is situated in a fixed position relative to the capture unit; and the capture unit and the rotational axis being set apart from each other.

According to an example embodiment of the present invention, in at least one method step, with the aid of at least one, in particular, the above-mentioned, control and/or regulating unit of the robot, at least one, in particular, an above-mentioned, distance conversion parameter is determined as a function of a movement of the capture unit about the rotational axis fixed during the movement, in particular, at a known distance from the rotational axis and/or in a known orientation relative to the rotational axis; in at least one further method step, the distance traveled by the robot being ascertained as a function of the determined distance conversion parameter. In at least one method step of the method, images of an area surrounding the robot are recorded with the aid of the monocular capture unit, in particular, the capture element of the capture unit. With the aid of the control and/or regulating unit, at least one distance parameter, which is, in particular, dimensionless or has an arbitrary unit different from a metric unit, is preferably ascertained as a function of two images recorded temporally offset from each other over a time interval. Preferably, with the aid of the control and/or regulating unit, during a determination of the distance conversion parameter, an angle of rotation about the rotational axis covered by the capture unit, in particular, by the capture element, during the movement of the capture unit, in particular, of the capture element, about the rotational axis fixed during the movement, in particular, at a known distance from the rotational axis and/or in a known orientation relative to the rotational axis, is ascertained, preferably, using a method of epipolar geometry. Preferably, with the aid of the control and/or regulating unit, as a function of the ascertained angle of rotation, the distance conversion parameter taking the form of a distance traveled by the capture unit, in particular, by the capture element, during the movement of the capture unit, in particular, of the capture element, about the rotational axis fixed during the movement, in particular, at a known distance from the rotational axis and/or in a known orientation relative to the rotational axis, is determined; the distance conversion parameter preferably being given in meters over the known placement of the capture unit, in particular the capture element, relative to the rotational axis. In particular, in at least one method step, in particular, after the determination of the distance conversion parameter, at least a distance traveled by the robot is ascertained as a function of the determined distance conversion parameter and an ascertained distance parameter of the path. In particular, the ascertained distance parameter is scaled over the distance conversion parameter and/or converted to meters with the aid of the control and/or regulating unit.

The design of the method according to the present invention may advantageously allow the distance traveled by the robot to be determined accurately and directly, in particular, independently of odometry. Low manufacturing costs are advantageously possible, in particular, since additional sensors for ascertaining the distance traveled by the robot may be omitted. In this manner, an advantageously compact design may be rendered possible. An advantageously flexible design of a drive system of the robot may be enabled. Advantageously accurate monitoring and localization of the robot may be rendered possible. In particular, the distance traveled by the robot may be ascertained without odometry, even in the case of robots movable from a surface, and/or movable indirectly via the propulsion of mobile robots, such as flying, suspended, or floating robots.

In addition, according to an example embodiment of the present invention, the distance conversion parameter is determined continuously or periodically, in each instance, over a time interval, with the aid of the control and/or regulating unit, in particular, using an/the above-mentioned algorithm; as a function of a movement of the robot, which takes place within the time interval, a determined value of the distance conversion parameter either being utilized for ascertaining the distance traveled, or being discarded. Advantageously automatic determination of the distance conversion parameter during normal operation of the robot may be rendered possible. Due to this, dedicated calibration movements may be advantageously omitted for the determination of the distance conversion parameter. An advantageously high efficiency of the robot during an action in normal operation may be enabled, for example, during suction operation, mowing operation, monitoring, or the like. An advantageously high accuracy of a determination of the distance traveled by the robot may be rendered possible, in particular, since an advantageously frequent determination of the distance conversion parameter for ascertaining the distance traveled by the robot may take place as a function of a working range of the robot and/or a movement pattern of the robot during normal operation. The algorithm is preferably executed with the aid of the control and/or regulating unit, as a function of the capture of images by the capture unit, which takes place, in particular, continuously or periodically. In particular, the time interval for determining the distance conversion parameter takes the form of an interval between capture times of at least two images, which are utilized for determining the distance conversion parameter and are recorded, in particular, by the capture unit. After the capture of the two images, the algorithm is preferably executed with the aid of the control and/or regulating unit, and/or the distance conversion parameter is determined over the two images, in particular, if a movement of the robot, in particular of the capture unit and/or of the capture element, which takes place within the time interval, is within the extreme range of movement.

In addition, according to an example embodiment of the present invention, in at least one method step, at least one calibration movement of the robot is carried out with the aid of the control and/or regulating unit and a steering and/or drive unit of the robot, for determining the distance conversion parameter; at least the capture unit being moved about the rotational axis at a known distance from the rotational axis and in a known orientation relative to the rotational axis. The robot may advantageously be controlled, in order to determine the distance conversion parameter. A need-based and/or situation-specific determination of the distance conversion parameter may be advantageously enabled; in particular, it being able to be ensured that the distance conversion parameter is determined under conditions suitable for movement of the capture unit during the determination. An advantageously uniform accuracy of a determination of the distance traveled by the robot may be rendered possible, in particular, since a determination of the distance conversion parameter at regular intervals via direct control of the robot may be ensured. The calibration movement preferably takes the form of a movement of the robot, in particular, of the capture unit, outside of normal operation of the robot, which takes place, in particular, between regular movements of the robot, such as for executing the action. The calibration movement preferably takes place within a plane, which runs at least substantially perpendicularly to the rotational axis. In particular, the calibration movement is carried out with the aid of the control and/or regulating unit, by activating the steering and/or drive unit, in particular, a motor of the steering and/or drive unit. The calibration movement is preferably performed with the aid of the steering and/or drive unit, by driving the at least two locomotion devices and/or the at least one steering device, which is/are operated, in particular, in such a manner, that at least the capture unit, in particular, the capture element, moves about the rotational axis, at a constant distance, within a plane, which runs at least substantially perpendicularly to the rotational axis; in particular, an orientation of the capture unit, in particular, of the capture element, relative to the rotational axis being rotated about the rotational axis, as well. During the calibration movement, at least the capture unit, in particular, the capture element, is moved about the rotational axis by an angle of rotation, in particular, the above-mentioned angle of rotation, in particular, within the plane, which extends at least substantially perpendicularly to the rotational axis. The main viewing direction and/or the detection range of the capture unit is preferably rotated about the rotational axis by the angle of rotation during the calibration movement.

In addition, in at least one method step, according to an example embodiment of the present invention, in a determination of a distance traveled by the robot within a time interval, with the aid of the control and/or regulating unit, at least one positional error parameter of the robot is ascertained as a function of an error in an ascertained distance parameter of the robot, as a function of an error in the distance conversion parameter utilized for ascertaining the distance traveled, and/or as a function of a positional error parameter of the robot ascertained for a distance traveled within a previous time interval. An inaccuracy of the determination of the distance traveled by the robot and/or of the position of the robot determined from it may be monitored; the inaccuracy being a function of, in particular, a time interval from the last determination of the distance conversion parameter. A "positional error parameter" is to be understood as, in particular, a parameter, which indicates an error in an ascertained position of the robot within a surrounding area and/or in space. With the aid of the control and/or regulating unit, a position of the robot is preferably determined as a function of at least ascertained distances traveled by the robot within a period of time. It is possible for a determination of a position of the robot within a surrounding area and/or in space to be made as a function of a starting point, such as a position of a charging station, in particular, at the beginning of an action or an operation of the robot. In a determination of the distance conversion parameter, in a determination of the distance parameter, and/or in a determination of an angle moved through, in particular, of the angle of rotation, about the rotational axis, an error in a value obtained in that manner is preferably ascertained with the aid of the control and/or regulating unit; the error resulting, for example, from a method of epipolar geometry, from the rounding of a value to be used, from unsharpness of an image, from a maximum resolution of the capture element, or the like. It is possible for the positional error parameter of the robot to be a function of the area surrounding the robot, for example, a number of objects distinguishable from each other within the surrounding area, and/or a function of visibility conditions. In particular, the error in the ascertained distance parameter of the robot, the error in the distance conversion parameter utilized for ascertaining the distance traveled, and/or the positional error parameter is/are stored in the control and/or regulating unit. In particular, for each, in particular, translational, movement of the robot, the control and/or regulating unit is configured to ascertain a positional error parameter, which describes, in particular, an uncertainty of a position of the robot caused by the movement. For example, an error in the angle of rotation ascertained from the at least two images by the control and/or regulating unit is essentially at least $0.5 \cdot 10^{-9}°$ to $3 \cdot 10^{-9}°$.

In addition, according to an example embodiment of the present invention, in at least one method step, in response to an exceedance of a limiting value of the ascertained positional error parameter, at least one calibration movement of the robot for determining the distance conversion parameter is executed with the aid of the control and/or regulating unit and the steering and/or drive unit. An advantageously uniform accuracy of a determination of the distance traveled by the robot may be advantageously rendered possible, in particular, since it may be ensured that the distance conversion parameter is re-determined as needed as a function of the positional error parameter. In response to exceedance of the limiting value of the ascertained positional error parameter, in particular, during normal operation, the steering and/or drive unit is preferably triggered to execute a calibration movement with the aid of the control and/or regulating unit. In particular, normal operation of the robot, in particular, for carrying out the action of the robot, is interrupted in response to exceedance of the limiting value of the ascertained positional error parameter, in order to execute the calibration movement. Alternatively, or in addition, in response to exceedance of the limiting value of the ascertained positional error parameter, it is possible for a, in particular, specific action of the robot to be ended prior to execution of the calibration movement. For example, a movement of the robot intended during regular operation is performed prior to execution of the calibration movement; and/or prior to the execution of the calibration movement, a stable position is assumed. In particular, the limiting value of the ascertained positional error parameter is stored in the control and/or regulating unit. It is possible for the control and/or regulating unit to contain at least one further limiting value of the positional error parameter. In the event of an exceedance of the further limiting value of the positional error parameter, triggering of the steering and/or drive unit to execute the calibration movements is preferably deactivated at least temporarily with the aid of the control and/or regulating unit. In this manner, in particular, in the case of incorrect capture of the capture unit, poor visibility conditions, and/or a different error of the robot, in particular, of the control and/or regulating unit, unintentionally frequent repetition of calibration movements may be prevented, and normal operation of the robot and/or execution of an action by the robot may be advantageously ensured.

In addition, according to an example embodiment of the present invention, in at least one method step, the calibration movement of the robot for determining the distance conversion parameter takes the form of a rotation of at least the capture unit about the rotational axis; a maximum angle of rotation of the calibration movement, in particular, of the capture unit about the rotational axis, being set with the aid of the control and/or regulating unit as a function of an ascertained image evaluation parameter relative to an image captured prior to or at the start of the calibration movement. It may be advantageously ensured that the calibration movement is sufficiently large to determine the distance conversion parameter, using acquired images. The calibration movement for determining the distance conversion parameter may be advantageously adapted to an area surrounding the robot; the calibration movement being able to be executed in such a manner, that a determination of the distance conversion parameter is possible. The distance traveled by the robot may be ascertained advantageously independently of an area surrounding the robot. The distance conversion parameter may advantageously be determined independently of an orientation of the robot. An "image evaluation parameter" is to be understood, in particular, as a parameter, which is ascertained, using a digital evaluation of an image, in particular, of an image recorded by the capture unit, and describes, in particular, a recognizable change with respect to another recorded image, in particular, an optical flow. The control and/or regulating unit and/or the capture unit is preferably designed to ascertain the image evaluation parameter from an image recorded by the capture unit and an image captured prior to or at a beginning of the calibration movement. For example, the image evaluation parameter takes the form of a vector of a pixel in the optical flow between the two images, of a difference in brightness in a pixel or a pixel region of the images, or of a different parameter appearing suitable to one skilled in the art, for distinguishing the two images. In particular, the control and/or regulating unit is configured to ascertain at least one image evaluation parameter as a function of at least two images, which are utilized for determining the distance conversion parameter and are recorded, in particular, prior to and after a calibration movement and/or the rotation by the maximum angle of rotation. At least one limiting value of the image evaluation parameter is preferably stored in the control and/or regulating unit. In particular, after a determination of the at least one image evaluation parameter, the ascertained image evaluation parameter is preferably compared to the limiting value of the image evaluation parameter with the aid of the control and/or regulation unit. The angular motion of the capture unit, in particular, of the capture element, about the rotational axis is preferably continued, if the ascertained image evaluation parameter is less than the limiting value of the image evaluation parameter. The angular motion of the capture unit, in particular, of the capture element, about the rotational axis is preferably ended by the control and/or regulating unit at the maximum angle of rotation, if the ascertained image evaluation parameter corresponds to the limiting value of the image evaluation parameter or exceeds it. In particular, the limiting value of the image evaluation parameter indicates a value of the image evaluation parameter, at which a difference between two recorded images, for which the image evaluation parameter was ascertained, is sufficiently large to ascertain, in particular, with a sufficiently high accuracy, an angle of rotation moved through about the rotational axis by the capture unit, in particular, by the capture element, during the movement of the capture unit, in particular, the capture element, about the rotational axis fixed during the movement, and/or to determine the distance conversion parameter, in particular, with a sufficiently high accuracy. In particular, the ascertained image evaluation parameter is compared to the limiting value of the image evaluation parameter during the angular motion of the capture unit, in particular, of the capture element, about the rotational axis, and/or during the calibration movement. It is possible for the maximum angle of rotation for determining the distance conversion parameter to be ascertained by the control and/or regulating unit in at least one method step; in at least one further method step, the ascertained, maximum angle of rotation during a further calibration movement being used; in particular, the further calibration movement being carried out over a rotation about the rotational axis by the maximum angle of rotation. Alternatively, or in addition, it is possible for a ratio of the ascertained image evaluation parameter to the limiting value of the image evaluation parameter to be calculated periodically, in particular, independently of calibration movements, with the aid of the control and/or regulating unit; a, in particular, repeated, determination of the maximum angle of rotation only being made when the limiting value is not reached or a limiting value for the ratio of the ascertained image evaluation parameter to the limiting value of the image evaluation parameter is not reached. In particular, in a determination of the maximum angle of rotation during a calibration movement with the aid of the control and/or regulating unit, for at least one angle of rotation, a determination of the image evaluation parameter and a comparison of the ascertained image evaluation parameter with the limiting value of the image evaluation parameter are carried out, in particular for more than one angle of rotation, at least until the ascertained image evaluation parameter corresponds to the limiting value of the image evaluation parameter or exceeds it.

In addition, according to an example embodiment of the present invention, in at least one method step, a frequency of a determination of the distance conversion parameter and/or a frequency of a calibration movement of the robot carried out by the control and/or regulating unit, for determining the distance conversion parameter, is set with the aid of an external unit and/or an operating unit of the robot. The distance traveled by the robot may be ascertained in an advantageously user-specific and/or application-specific manner. In particular, a required accuracy of the ascertained distance traveled by the robot may be set by adjusting the frequency of determination of the distance conversion parameter and/or the frequency of the calibration movement. In particular, in the case of the control of the robot for determining the distance conversion parameter, by setting the frequency of determining the distance conversion parameter and/or the frequency of the calibration movement, a user or a system may set a time, which the robot may/is able to spend for calibration movements, which means that, in particular, an operating time of the robot during normal operation may be adjusted. The operating unit preferably takes the form of a keyboard field, a touch display, a microphone, in particular, for voice control, or the like. It is possible for the robot to include a communications unit, in particular, for preferably wireless data transmission with the external unit. The external unit preferably takes the form of a smartphone, a server, in particular, a smart home system or the like, a remote control, another robot, or the like. In particular, the external unit is provided for remote control and/or programming of the robot, in particular, of the control and/or regulating unit. It is particularly preferable for the frequency of determining the distance conversion parameter and/or the frequency of a calibration movement of the robot executed by the control and/or regulating unit for determining the distance conversion parameter to be adjustable by setting at least one operating parameter and/or at least one limiting value, which is/are stored in the control and/or regulating unit. For example, the frequency of a determination of the distance conversion parameter and/or the frequency of a calibration movement of the robot executed via the control and/or regulating unit, for determining the distance conversion parameter, may be adjusted by setting the limiting value of the positional error parameter, by setting the limiting value of the image evaluation parameter, by setting a triggering parameter of the control and/or regulating unit for triggering the steering and/or drive unit, or the like. Alternatively, or in addition, it is possible for a setting of the steering and/or drive parameter to be deactivated or activated via the control and/or regulating unit, with the aid of the external unit and/or the operating unit of the robot; in particular, the frequency of a determination of the distance conversion parameter and/or the frequency of a calibration movement executed by the control and/or regulating unit, for determining the distance conversion parameter, being set. In particular, a portion of a time, during which the robot is in normal operation and/or executes an action, may be set, using the frequency of a determination of the distance conversion parameter and/or the frequency of a calibration movement of the robot executed by the control and/or regulating unit, for determining the distance conversion parameter. For example, in the case of a mowing robot, where, for example, at a plot of grass, a position of the robot does not have to be determined as accurately, a time for a mowing operation may be advantageously increased, by reducing the frequency of a determination of the distance conversion parameter and/or the frequency of a calibration movement of the robot executed by the control and/or regulating unit for determining the distance conversion parameter.

In addition, in at least one method step, a frequency of a determination of the distance conversion parameter and/or a frequency of a calibration movement of the robot carried out by the control and/or regulating unit, for determining the distance conversion parameter, is set by the control and/or regulating unit as a function of at least one surrounding-area parameter measured by a, in particular, the above-mentioned, sensor unit of the robot. In particular, in the case of steering the robot as a function of the positioning error parameter, unintentionally frequent calibration movements may be advantageously prevented in poor, for example, weather-dependent, visibility conditions, or the like. In particular, during the steering of the robot as a function of the image evaluation parameter, unintentionally large and time-consuming calibration movements in poor, for example, weather-dependent, visibility conditions may be advantageously prevented in a similar environment, for example, in empty spaces, or the like. This may allow advantageously surrounding-area-specific adjustment of a behavior of the robot, in order to ascertain the distance traveled by the robot. An advantageously high level of flexibility of the robot with regard to an area of application and/or with regard to environmental conditions may be attained during operation. Surrounding-area-specific control of the robot and/or an adjustment of a moving behavior of the robot to the area surrounding the robot is preferably carried out by setting the frequency of a determination of the distance conversion parameter and/or the frequency of a calibration movement of the robot executed by the control and/or regulating unit, for determining the distance conversion parameter with the aid of the control and/or regulating unit, via the surrounding-area parameter. In particular, at least one limiting value of the surrounding-area parameter is stored in the control and/or regulating unit; in particular, in response to the exceedance or non-attainment of the limiting value of the surrounding-area parameter by a measured surrounding-area parameter, the frequency of a determination of the distance conversion parameter and/or the frequency of a calibration movement of the robot executed by the control and/or regulating unit, being set for determining the distance conversion parameter. It is possible for a plurality of surrounding-area parameters different from each other to be measured with the aid of the sensor unit; for each surrounding-area parameter, at least one limiting value of the surrounding-area parameter preferably being stored in the control and/or regulating unit. For example, in the case of measuring a value of a surrounding-area parameter taking the form of a rain state, where, in particular, it may be assumed that image evaluation is made more difficult by poorer visibility conditions, and the value exceeds a limiting value of the surrounding-area parameter taking the form of a rain state, the stored limiting value of the positional error parameter is adjusted, in particular, in order to set the frequency of a determination of the distance conversion parameter and/or the frequency of a calibration movement of the robot executed by the control and/or regulating unit, for determining the distance conversion parameter. Consequently, in particular, an increased frequency of a determination of the distance conversion parameter and/or frequency of a calibration movement of the robot executed by the control and/or regulating unit, for determining the distance conversion parameter, may be prevented in more difficult visibility conditions, using an increased positional error parameter, which means that otherwise, a delay in an action of the robot would occur. In a further illustrative refinement, an approach of an object, such an another robot, is detected with the aid of the sensor unit, in particular, of the surrounding-area parameter; a calibration movement being interrupted at least temporarily with the aid of the control and/or regulating unit, in particular, in order to prevent a collision of the robot with the object. Alternatively, or in addition, it is possible for an emergency control protocol of the robot to be activated by the control and/or regulating unit as a function of the measured surrounding-area parameter, for example, in the case of heavy rainfall or a fire in the area surrounding the robot; the robot preferably being moved into a protected position, such as onto a safe surface or into a charging station, and the execution of a calibration movement being deactivated at least temporarily.

In addition, according to an example embodiment of the present invention, in at least one method step, in particular, prior to initial operation of the robot, at least one position of the capture unit relative to the rotational axis is determined with the aid of a user, with the aid of an external unit, and/or with the aid of the control and/or regulating unit, and stored in a storage unit of the control and/or regulating unit for determining the distance conversion parameter. An advantageously low amount of required computing power of the control and/or regulating unit in a determination of the distance traveled may be achieved, in particular, since this may be ascertained, using only one measured variable, by fixing a distance vector of the capture unit with respect to the rotational axis. This allows an advantageously flexible design of the robot with regard to a position of the capture unit. Variable positioning of the capture unit during operation may be allowed, for example, on an arm of the robot, or the like, in particular, since the position of the capture unit relative to the rotational axis may be adjusted for determining the distance conversion parameter and/or for ascertaining the distance traveled by the robot. In the case of manufacturing and/or assembly of the robot, the position of the capture unit relative to the rotational axis is preferably determined and stored in the control and/or regulating unit. The stored position of the capture unit relative to the rotational axis is preferably utilized by the control and/or regulating unit for determining the distance conversion parameter; in particular, the distance conversion parameter being determined as a function of the position of the capture unit relative to the rotational axis and the angle of rotation moved through during a calibration movement and/or during a rotation of the capture unit about the rotational axis for determining the distance conversion parameter.

Alternatively, or in addition, it is possible for the position of the capture unit relative to the rotational axis to be ascertained during or prior to a determination of the distance conversion parameter, in particular, with the aid of the control and/or regulating unit and the steering and/or drive unit and/or the sensor unit. In particular, it is possible for the capture unit, in particular, the capture element, to be movable relative to the rotational axis, for example, via a robot arm or the like; in particular, the steering and/or drive unit and the control and/or regulating unit being designed to ascertain the position of the capture unit relative to the rotational axis, using a displacement of motors of the steering and/or drive unit for moving the capture unit, in particular, the capture element; and/or the sensor unit being provided to measure the position of the capture unit relative to the rotational axis, using, in particular, a further sensor element.

In this connection, the robot of the present invention and/or the method of the present invention shall not be limited to the use and specific embodiment described above. In particular, in order to achieve a functionality described here, the robot of the present invention and/or the method of the present invention may have a number of individual elements, component parts and units, as well as method steps, different from a number mentioned here. In addition, in the ranges of values indicated in this description, values lying within the above-mentioned limits are also to be acknowledged as described and as arbitrarily applicable.

BRIEF DESCRIPTION OF THE DRAWINGS

Further advantages are derived from the following description of figures. Two exemplary embodiments of the present invention are shown in the figures. The figures and the description include numerous features in combination. One skilled in the art will necessarily consider the features individually, as well, and unite them to form useful, further combinations.

FIG. 4 shows a schematic representation of an illustrative sequence of the method of the present invention for ascertaining a distance traveled by the robot of the present invention.

DETAILED DESCRIPTION OF EXAMPLE EMBODIMENTS

Figure 1:
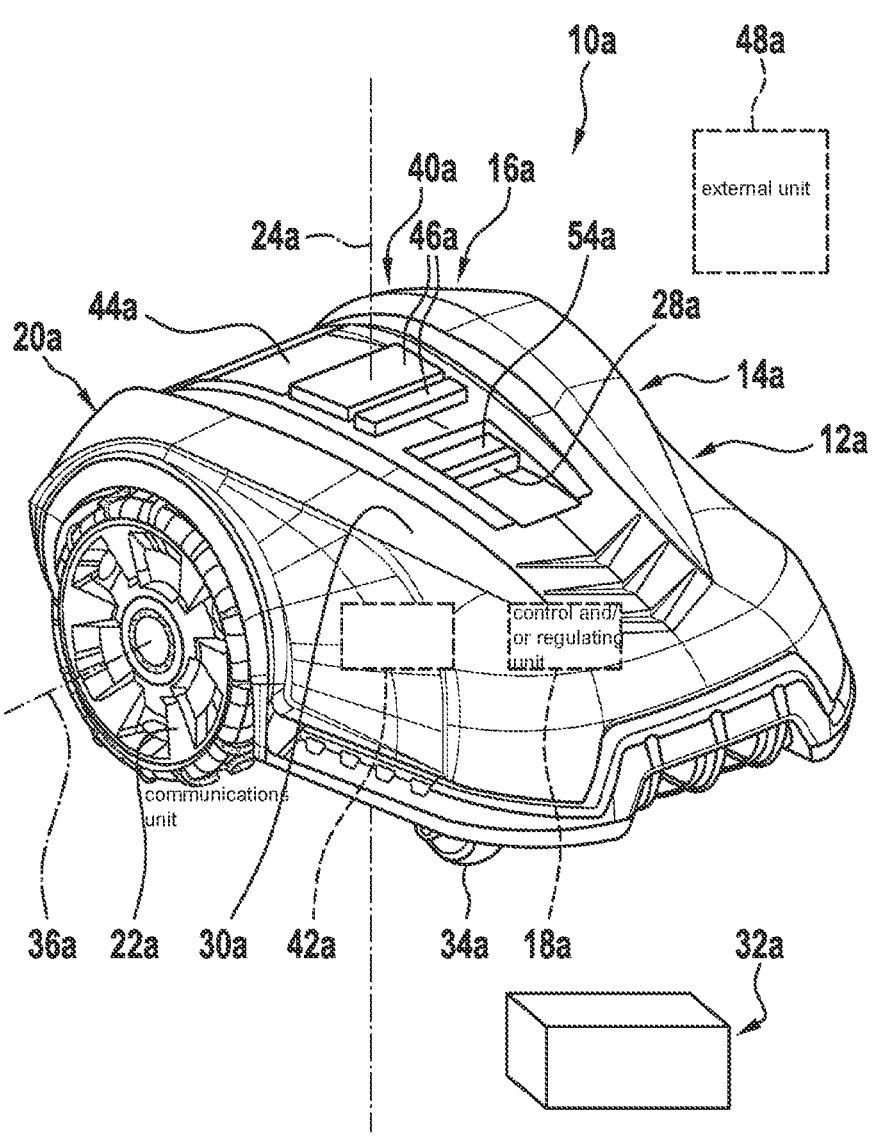
FIG. 1 shows a perspective view of a robot of the present invention, for performing a method of the present invention of ascertaining a distance traveled by the robot; the robot taking the form of a mowing robot.

A robot 10a, which takes the form of a mowing robot and is, in particular, semiautonomous, is shown in FIG. 1. Robot 10a takes the form of a mobile robot. Other embodiments of robot 10a are also possible, for example, as a robot vacuum cleaner or a different type of cleaning robot, as a monitoring drone, as a transport robot or the like, and/or as a fully autonomous robot. Robot 10a includes a steering and/or drive unit 12a, a monocular capture unit 14a, a sensor unit 16a, a control and/or regulating unit 18a, and a housing 20a. Robot 10a includes two powered locomotion devices 22a, which take the form of, in particular, wheels. The two locomotion devices 22a are designed to rotate at least capture unit 14a about a rotational axis 24a, which is situated in a fixed position relative to capture unit 14a; capture unit 14a and rotational axis 24a being set apart from each other. Other embodiments of locomotion devices 22a are also possible, for example, as rolls, as rollers for driving caterpillar tracks, or as rotors. Control and/or regulating unit 18a is configured to ascertain a distance traveled 26a by robot 10a (see FIGS. 3A and 3C). Capture unit 14a includes exactly one capture element 28a, which takes the form of a monocular camera, and at least, in particular, part of which is situated on an outer wall 30a of housing 20a. Capture unit 14a, in particular, capture element 28a, is preferably designed to monitor an area surrounding robot 10a and/or objects 32a in the area surrounding robot 10a. In particular, sensor unit 16a is situated on outer wall 30a of housing 20a. At least most of control and/or regulating unit 18a and of steering and/or drive unit 12a is situated within housing 20a and/or surrounded by housing 20a. In particular, the two powered locomotion devices 22a take the form of a part of steering and/or drive unit 12a. Steering and/or drive unit 12a includes two further locomotion devices 34a, which are, in particular, rotatable about a vertical axis and are, in particular, not powered. The two powered locomotion devices 22a are positioned coaxially to each other and may be driven differentially. Rotational axis 24a intersects a common axis of rotation 36a of the two powered locomotion devices 22a at at least essentially one point, in particular, a midpoint of axis of rotation 36a. Rotational axis 24a is at least substantially perpendicular to a horizontal, which includes, in particular, axis of rotation 36a of the two locomotion devices 22a. The two powered locomotion devices 22a preferably take the form of steering devices; steering of robot 10a being accomplished by driving the two locomotion devices 22a differentially. The two locomotion devices 22a are preferably able to be driven in such a manner, that robot 10a rotates at least substantially on a spot, about rotational axis 24a. Robot 10a is designed to execute a method 38a of ascertaining a distance traveled 26a by robot 10a.

Capture unit 14a, in particular, capture element 28a, and sensor unit 16a are situated on an upper side of housing 20a. Robot 10a includes an operating unit 40a and a communications unit 42a. Operating unit 40a includes a display 44a and a plurality of keys 46a, which are situated, in particular, on the upper side of housing 20a. Communications unit 42a is intended for wireless transmission of electronic data with an external unit 48a, such as a smartphone, a server, another robot, a computer, or the like. In particular, communications unit 42a is designed for radio communication with, for example, external unit 48a. However, other embodiments of operating unit 40a and/or of communications unit 42a are also possible. Robot 10a includes, in particular, an energy storage unit (not shown in the figures), which takes the form of, in particular, a rechargeable storage battery. However, other embodiments of the energy storage unit are also possible. In normal operation, robot 10a is preferably intended for mowing operation; in particular, with the aid of a processing tool of robot 10a (not shown in the figures), plants on a surface traveled over by robot 10a being cut.

As a function of a movement of capture unit 14a about the rotational axis 24a fixed during the movement, control and/or regulating unit 18 is configured to determine a distance conversion parameter, which is provided for ascertaining the distance traveled 26a by robot 10a; the capture unit being positioned at a known distance 60a from rotational axis 24a (cf. FIG. 2, for example) and in a particular orientation relative to rotational axis 24a. Control and/or regulating unit 18a is preferably configured to determine the distance conversion parameter and to ascertain the distance traveled 26a by robot 10a as a function of exclusively data acquired by capture unit 14a, in particular, capture element 28a, and preferably independently of sensor unit 16a and/or sensor elements. Control and/or regulating unit 18a is configured to determine the distance conversion parameter as a function of an angle of rotation 50a moved through about rotational axis 24a (cf. FIGS. 3A, 3B, and 3C, as well as FIG. 6) by capture unit 14a, in particular, by capture element 28a, during the movement of capture unit 14a, in particular, of capture element 28a, about the rotational axis 24a fixed during the movement; the angle of rotation being ascertained from an image prior to the movement about rotational axis 24a and another image after the movement about rotational axis 24a, and as a function of a position of capture unit 14a, in particular, capture element 28a, relative to rotational axis 24a, using, in particular, a method of epipolar geometry (cf. FIG. 3B).

Steering and/or drive unit 12a is provided for moving robot 10a; control and/or regulating unit 18a being configured to set at least one steering and/or drive parameter of steering and/or drive unit 12a, in order to determine the distance conversion parameter, in particular, to carry out a calibration movement. Steering and/or drive unit 12a includes two motors, in particular, electric motors (not shown in the figures); each of the two locomotion devices 22a being able to be driven, in each instance, by one of the motors. The steering and/or drive parameter preferably takes the form of a motive force to be transmitted to one of the two locomotion devices 22a and/or the form of a direction of the motive force to be transmitted. Control and/or regulating unit 18a is preferably configured to move and/or rotate robot 10a, in particular, to rotate it about rotational axis 24a, via a setting of the steering and/or drive parameter. In particular, the two further locomotion devices 34*a* are not powered and are freely rotatable about an axis of rotation; the axis of rotation of further locomotion devices 34*a* being positioned at least substantially parallelly to rotational axis 24*a* and/or vertically with respect to the ground.

Figure 3A:
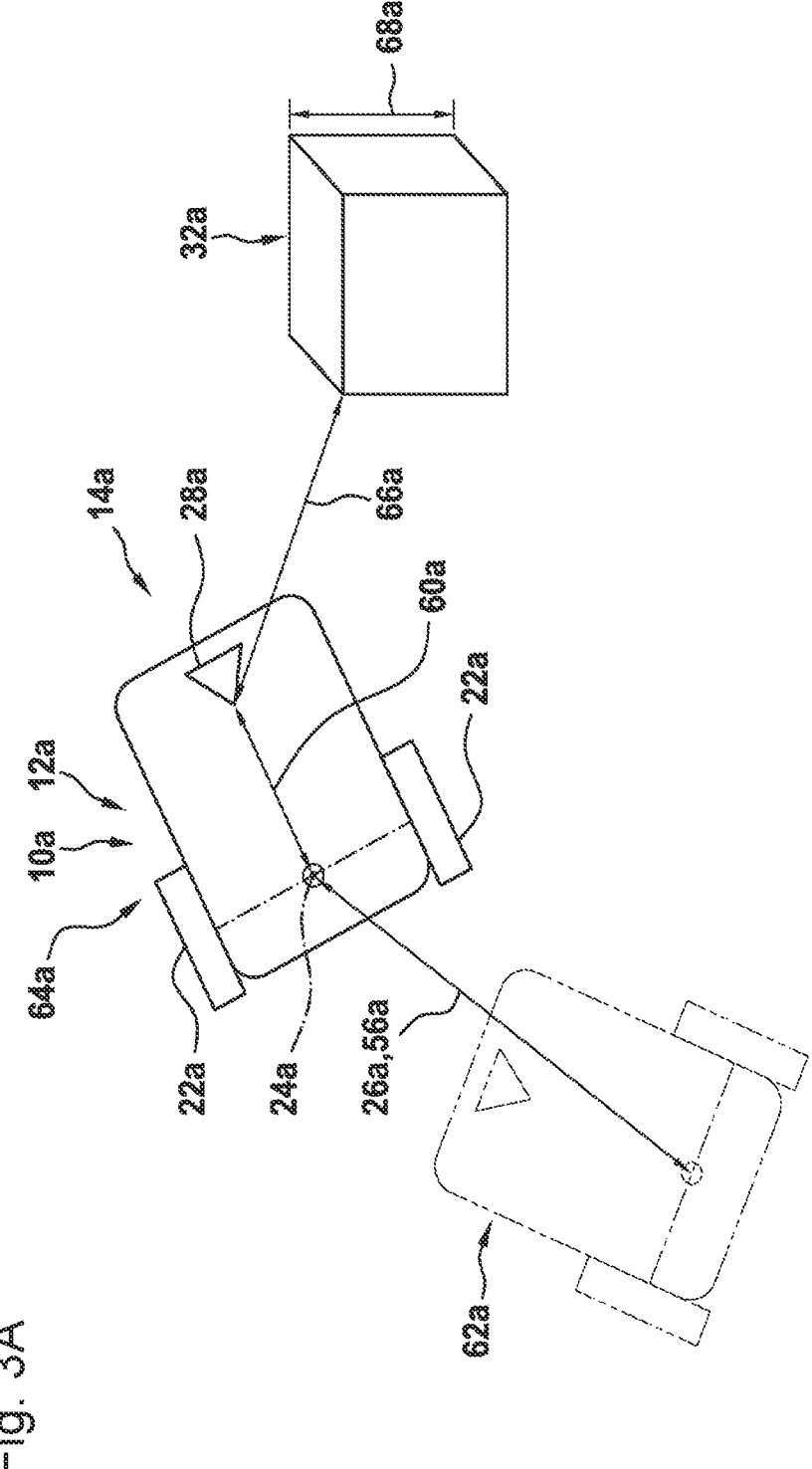
FIG. 3A shows a schematic representation of a movement of the robot of the present invention relative to an object.
Figure 3B:
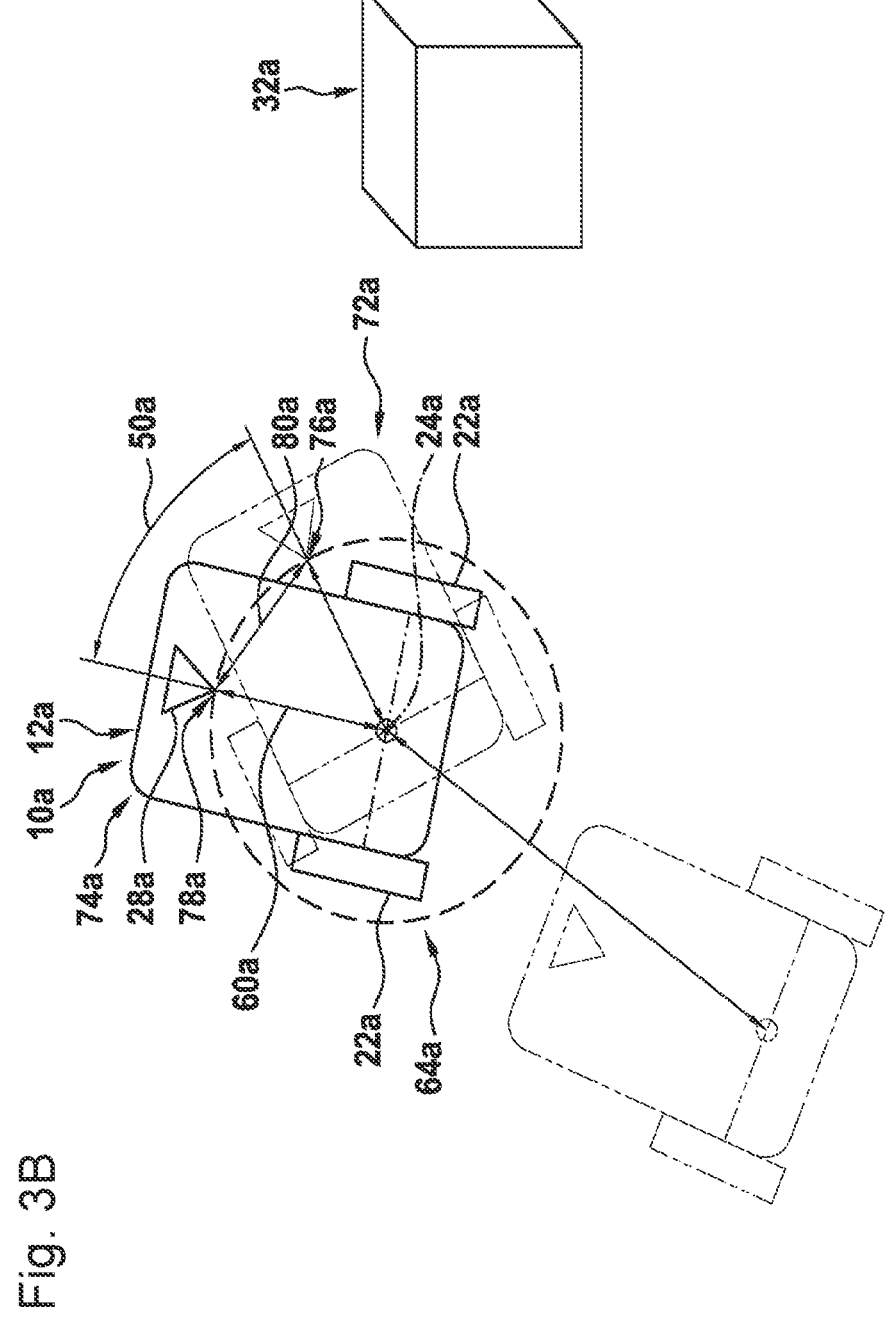
FIG. 3B shows a schematic representation of a calibration movement of the robot of the present invention during a movement.
Figure 3C:
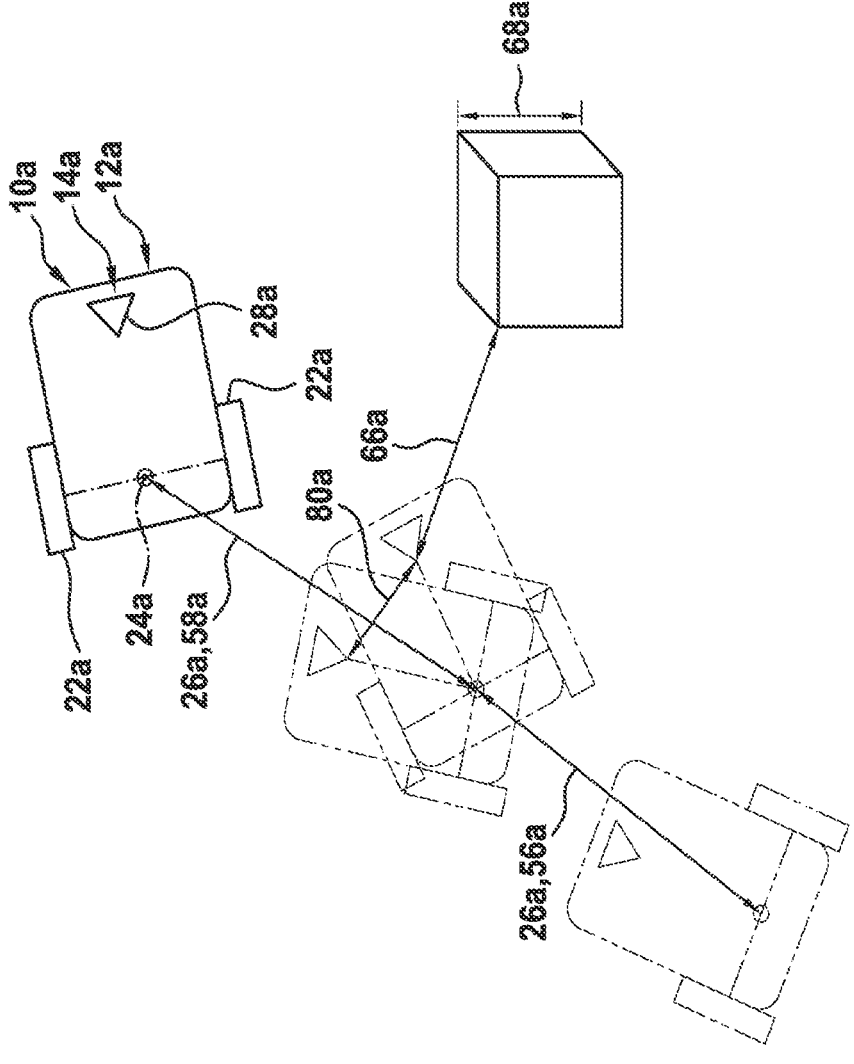
FIG. 3C shows a schematic representation of a movement of the robot of the present invention after the calibration movement; measured distances and intervals having been ascertained with the aid of a distance conversion parameter determined, using the calibration movement.

Control and/or regulating unit 18*a* is configured to ascertain a, in particular, view-specific distance parameter with the aid of an evaluation of two images recorded temporally offset from each other, by capture unit 14*a*, and to scale the ascertained distance parameter over the determined distance conversion parameter, in order to ascertain the distance traveled 26*a*, in particular, between two capture times of the two images (see also FIGS. 3A through 3C). In particular, the distance parameter is dimensionless, or its unit is a unit different from a metric unit. In particular, capture unit 14*a* is designed to record, continuously or periodically, images of the area surrounding robot 10*a* and/or of objects 32*a* inside of the area surrounding robot 10*a*, in particular, at a frequency of at least essentially 60 Hz. Control and/or regulating unit 18*a* is preferably configured to ascertain the at least one distance parameter from the two images recorded temporally offset from each other, using a method of epipolar geometry (cf. FIG. 6, as well). Control and/or regulating unit 18*a* includes an algorithm 52*a* for determining the distance conversion parameter (cf. FIG. 5) and is configured to execute algorithm 52*a* continuously or periodically, in particular, during normal operation of robot 10*a*. Algorithm 52*a* is additionally provided for ascertaining the distance traveled 26*a* by robot 10*a*, which is calculated, in particular, as a function of the distance conversion parameter and the ascertained distance parameter.

In particular, sensor unit 16*a* includes a sensor element 54*a*, which takes the form of a rain sensor and is designed to measure a surrounding-area parameter taking the form of a rain state. Other embodiments of sensor unit 16*a*, in particular, of sensor element 54*a*, are also possible, for example, as a proximity sensor, as an odometric sensor, as a position detection sensor, or the like.

Figure 2A:
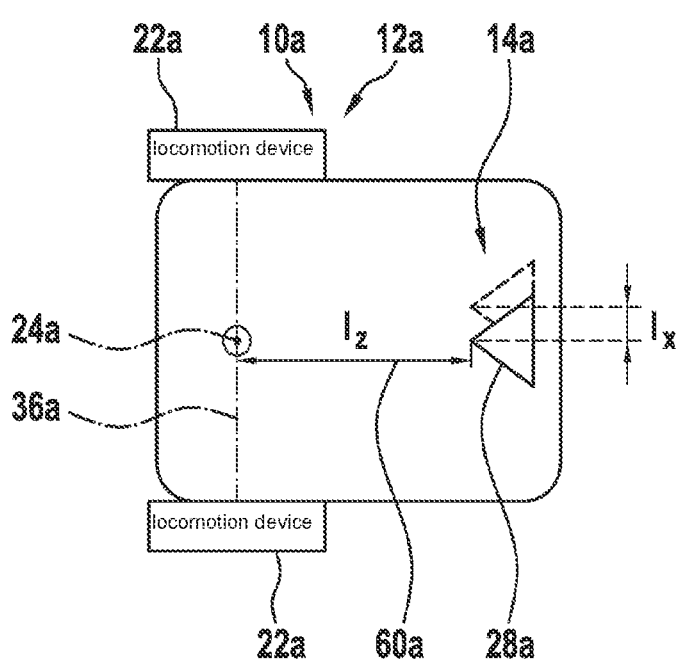
FIG. 2A shows a schematic plan view of the robot of the present invention, having a monocular capture unit.
Figure 2B:
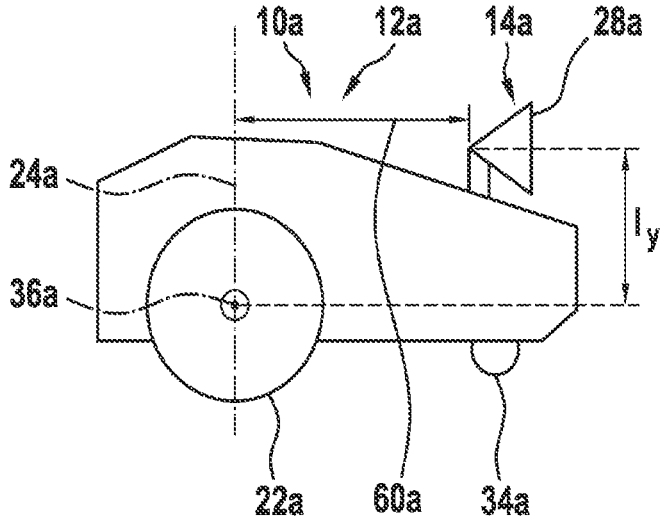
FIG. 2B shows a schematic side view of the robot of the present invention, having the monocular capture unit.

A top view and a side view of the positioning of capture unit 14*a*, in particular, of capture element 28*a*, relative to rotational axis 24*a* is shown in FIGS. 2A and 2B. Capture unit 14*a*, in particular, capture element 28*a*, is situated at a minimum distance $l_z$ from a plane, which is spanned by axis of rotation 36*a* of the two powered locomotion devices 22*a* and rotational axis 24*a*; the minimum distance corresponding, in particular, to minimum distance 60*a* of capture unit 14*a*, in particular, of capture element 28*a*, and of rotational axis 24*a*. Capture unit 14*a*, in particular, capture element 28*a*, is positioned on a plane containing rotational axis 24*a* and intersecting axis of rotation 36*a* perpendicularly. It is also possible for capture unit 14*a*, in particular, capture element 28*a*, to be situated at a minimum distance $l_x$ from the plane containing rotational axis 24*a* and intersecting axis of rotation 36*a* perpendicularly, which is indicated, in particular, in FIG. 2A. Capture unit 14*a*, in particular, capture element 28*a*, is situated at a minimum distance $l_y$ from a plane containing axis of rotation 36 and intersecting rotational axis 24*a* perpendicularly. The position of capture unit 14*a*, in particular, of capture element 28*a*, relative to rotational axis 24*a*, is given by distances $l_z$, $l_x$, and $l_y$. The position of capture unit 14*a*, in particular, of capture element 28*a*, relative to rotational axis 24*a*, is stored in control and/or regulating unit 18*a*, using distances $l_z$, $l_x$, and $l_y$.

A movement of robot 10*a* is shown step-by-step in FIGS. 3A, 3B, and 3C; after a first path of movement 56*a*, a calibration movement of robot 10*a* for determining the distance conversion parameter being carried out, before robot 10*a* moves further on a second path of movement 58*a*. In particular, distance parameters measured and ascertained over the distance conversion parameter determined during the calibration movement are scaled and/or converted to meters with the aid of control and/or regulating unit 18*a*; distances traveled 26*a* by robot 10*a* preferably being ascertained. In particular, movements of robot 10*a* are each represented two-dimensionally in a plane in FIGS. 3A, 3B, and 3C. However, arbitrary movements of robot 10*a* in three-dimensional space are also possible, preferably, for determining the distance conversion parameter, as well; in particular, the movement of capture unit 14*a* taking place at a known, constant distance 60*a* from rotational axis 24*a*, about rotational axis 24*a*, in order to determine the distance conversion parameter within a plane. For example, a calibration movement of robot 10*a* on an incline is also possible; the plane, in which the calibration movement takes place, and rotational axis 24*a*, being oriented at least substantially at an incline to a horizontal.

In FIG. 3A, robot 10*a* is shown after having covered first path of movement 56*a*. Using an image, which was recorded by capture unit 14*a* prior to the coverage of first path of movement 56*a*, in particular, at a position 62*a*, and a further image, which was recorded by capture unit 14*a* after the coverage of first path of movement 58*a*, in particular, at a position 64*a*, a plurality of distance parameters, which take the form of, in particular, first path of movement 56*a* covered by robot 10*a*, distance 66*a* of capture unit 14*a*, in particular, of capture element 28*a*, from an object 32*a*, and dimension 68*a* of object 32*a*, are ascertained with the aid of control and/or regulating unit 18*a*, using a method of epipolar geometry. The embodiment described here is described illustratively. Alternatively, or in addition, many other forms of paths of movement 56*a*, 58*a* and/or the distance parameters are possible, as well. Using the two images recorded by monocular capture unit 14*a*, in particular, the image and the further image, it is not possible to specify distance traveled 26*a* and/or one of the other distance parameters in metric units, in particular, in meters, since, in particular, no scaling of distances 56*a*, 58*a* and/or dimension 68*a* is possible by the method of epipolar geometry, using two images recorded in different positions 62*a*, 64*a*.

In FIG. 3B, robot 10*a* is shown at position 64*a*, after the calibration movement for determining the distance conversion parameter; robot 10*a* preferably having rotated in place about rotational axis 24*a*, at position 64*a*. The calibration movement takes the form of a movement of capture unit 14*a* about the rotational axis 24*a* fixed during the movement, at a known distance 60*a* from rotational axis 24*a*; capture unit 14*a*, in particular, capture element 28*a*, being rotated about rotational axis 24*a* with regard to an orientation, in particular, of a capture range 70*a* and/or of a main viewing direction of capture unit 14*a* (see FIG. 6). During the calibration movement/the movement about rotational axis 24*a*, capture unit 14*a* moves through angle of rotation 50*a*, which is preferably ascertained by the control and/or regulating unit 18*a*, using an image recorded by capture unit 14*a* prior to the calibration movement, in particular, in a position 72*a* of robot 10*a*, and a further image recorded by capture unit 14*a* after the calibration movement, in particular, in a further position 74*a* of robot 10*a*, through a method of epipolar geometry (cf. FIG. 6). The distance conversion parameter takes the form of a distance 80*a* from a position 76*a* of capture unit 14*a*, in particular of capture element 28*a*, in the place 72*a* of robot 10*a* prior to the calibration movement, to a different position 78*a* of capture unit 14*a*, in particular, of capture element 28*a*, in the further place 74*a* of robot 10a after the calibration movement. With the aid of control and/or regulating unit 18a, the distance conversion parameter is determined, in particular, calculated, from angle of rotation 50a and the position of capture unit 14a, in particular, of capture element 28a, relative to rotational axis 24a, using a trigonometric computation. Using a method of epipolar geometry, the distance 80a of a position of capture unit 14a, in particular, of capture element 28a, in the place of robot 10a prior to the calibration movement, from a position of capture unit 14a, in particular of capture element 28a, in the other place of robot 10a after the calibration movement, is ascertained dimensionlessly or in a unit other than a metric unit, with the aid of control and/or regulating unit 18a, as well, using an image recorded prior to the calibration movement and a further image recorded after the calibration movement. Using the distance conversion parameter, distances, intervals, and/or dimensions ascertained by the method of epipolar geometry, in particular, the ascertained distance parameters, may be scaled and/or converted to metric units, in particular, to meters.

In FIG. 3C, robot 10a is shown after coverage of second path of movement 58a, after the calibration movement. Using the determined distance conversion parameter, ascertained distance parameters, which also include the paths of movement 56a, 58a covered by robot 10a, are scaled and/or converted to metric units, in particular, meters, with the aid of control and/or regulating unit 18a. This allows metric monitoring of the area surrounding robot 10a and advantageously accurate determination of a distance traveled 26a by robot 10a.

During the movement of robot 10a shown in FIGS. 3A, 3B, and 3C, the distance conversion parameter is determined by executing the calibration movement; in particular, normal operation, such as mowing operation, of robot 10a being interrupted to determine the distance conversion parameter. It is also possible for the distance conversion parameter to be determined during normal operation. In particular, it is possible for the distance conversion parameter to be determined continuously or periodically, in each instance, over a time interval, with the aid of control and/or regulating unit 18a, in particular, using algorithm 52a; as a function of a movement of robot 10a, which takes place within the time interval, a determined value of the distance conversion parameter either being utilized for ascertaining the distance traveled 26a, or being discarded. In particular, a movement of robot 10a between two images utilized for determining the distance conversion parameter or for ascertaining a distance parameter is analyzed with the aid of control and/or regulating unit 18a; as a function of the movement of the robot in a time interval between the two images and/or of a ratio of the movement of the robot in the time interval to an extreme range of movement, which is stored, in particular, in control and/or regulating unit 18a, it being decided, with the aid of control and/or regulating unit 18a, if the two images are utilized for determining the distance conversion parameter, and/or if a distance conversion parameter determined over the two images is utilized for ascertaining a distance traveled 26a by robot 10a, or discarded.

As an alternative to the embodiment of robot 10a shown in FIGS. 1 through 3C, in particular, of the movement of robot 10a during the calibration movement, it is possible for robot 10a, in particular, the two locomotion devices 22a, to be designed to move at least capture unit 14a, in particular, capture element 28a, about a rotational axis 24a during the calibration movement and/or during the movement to determine the distance conversion parameter; the rotational axis being situated outside of robot 10a. For example, it is possible for locomotion devices 22a of robot 10a to be controlled and/or steered in such a manner, that robot 10a, in particular, capture unit 14a, moves in an arc about rotational axis 24a; a distance of capture unit 14a, in particular, of capture element 28a, from rotational axis 24a during the movement being adjustable and, in particular, ascertainable or known via a setting of locomotion devices 22a and/or steering devices and a motive force transmitted to locomotion devices 22a.

In particular, it is possible for the distance conversion parameter to be able to be determined on an inclined surface, as well; the movement of capture unit 14a, in particular, of capture element 28a, about rotational axis 24a, in particular, a calibration movement, being carried out within a plane inclined with respect to a horizontal.

An example of a sequence of method 38a for ascertaining the distance traveled 26a by robot 10a is shown in FIG. 4. In a method step 82a of method 38a, in particular prior to initial operation of robot 10a, at least one position of capture unit 14a relative to rotational axis 24a is determined with the aid of a user, with the aid of external unit 48a, and/or with the aid of control and/or regulating unit 18a, and stored in a storage unit of control and/or regulating unit 18a for determining the distance conversion parameter. Alternatively, or in addition, it is possible for the position of capture unit 14a relative to rotational axis 24a, in particular, during normal operation and/or in the case of a movable capture unit 14a, to be able to be set and/or adjusted with the aid of communications unit 42a and/or with the aid of operating unit 40a. For example, it is possible for the position of capture unit 14a relative to rotational axis 24a to be acquired and/or ascertained with the aid of a robot 10a actuator unit that moves the capture unit 14a and/or with the aid of another sensor element of sensor unit 16a.

In a further method step 84a of method 38a, in a determination of a distance traveled 26a by robot 10a within a time interval, at least one positional error parameter of robot 10a is ascertained with the aid of control and/or regulating unit 18a as a function of an error in an ascertained distance parameter of robot 10a, as a function of an error in the distance conversion parameter utilized for ascertaining distance traveled 26a, and/or as a function of a positional error parameter of robot 10a ascertained for a distance traveled 26a within a previous time interval. In a further method step 86a of method 38a, in response to an exceedance of a limiting value of the ascertained positional error parameter, at least one calibration movement of robot 10a for determining the distance conversion parameter is executed with the aid of control and/or regulating unit 18a and steering and/or drive unit 12a. In a further method step 88a of method 38a, at least one calibration movement of robot 10a for determining the distance conversion parameter is executed with the aid of control and/or regulating unit 18a and steering and/or drive unit 12a of robot 10a; at least capture unit 14a being moved about rotational axis 24a at the known distance 60a from rotational axis 24a and in a known orientation relative to rotational axis 24a. It is possible for a calibration movement of robot 10a to be carried out in regular intervals with the aid of control and/or regulating unit 18a and steering and/or drive unit 12a.

In a further method step 90a of method 38a, with the aid of control and/or regulating unit 18a of robot 10a, the at least one distance conversion parameter is determined as a function of a movement of capture unit 14a about the rotational axis 24a fixed during the movement, in particular, at the known distance 60a from rotational axis 24a and/or in a known orientation relative to rotational axis 24a. In particular, the distance conversion parameter is determined after and/or during the calibration movement. It is particularly preferable for the distance conversion parameter to be determined by control and/or regulating unit $18a$ as a function of the ascertained and/or stored position of capture unit $14a$, in particular, of capture element $28a$, relative to rotational axis $24a$ of the calibration movement, and as a function of the angle of rotation $50a$ about rotational axis $24a$ moved through by capture unit $14a$, in particular, by capture element $28a$, during the calibration movement. As already described above with regard to FIGS. 3A, 3B, and 3C, it is possible for the distance conversion parameter to be determined continuously or periodically, in each instance, over a time interval, with the aid of control and/or regulating unit $18a$, in particular, using algorithm $52a$; as a function of a movement of robot $10a$, which takes place within the time interval, a determined value of the distance conversion parameter either being utilized for ascertaining the distance traveled $26a$, or being discarded. In a method step of method $38a$, in particular, method step $90a$, where the calibration movement of robot $10a$ for determining the distance conversion parameter takes the form of a rotation of at least capture unit $14a$ about rotational axis $24a$, a maximum angle of rotation of the calibration movement, in particular, of capture unit $14a$, about rotational axis $24a$, being set with the aid of control and/or regulating unit $18a$ as a function of an ascertained image evaluation parameter relative to an image captured prior to or at the start of the calibration movement.

In a further method step $92a$ of method $38a$, the distance traveled $26a$ by robot $10a$ is ascertained as a function of the determined distance conversion parameter. In particular, the distance traveled $26a$ by robot $10a$ is ascertained with the aid of the distance conversion parameter, by scaling an ascertained distance parameter taking the form of a distance $80a$ traveled by robot $10a$ and ascertained, using a method of epipolar geometry. A distance traveled $26a$ by robot $10a$ during normal operation of robot $10a$ is preferably ascertained continuously or periodically, using a, in particular, last, determined distance conversion parameter, as a function of a distance parameter ascertained by a method of epipolar geometry during normal operation. The distance conversion parameter is preferably determined at regular intervals during operation of robot $10a$, in particular, as a function of the ascertained positional error parameter. However, it is also possible for the distance conversion parameter to be determined, in particular, independently of the positional error parameter, in regular time intervals, which are stored, in particular, in control and/or regulating unit $18a$ and/or are adjustable, using external unit $48a$ and/or operating unit $40a$.

In a further method step $94a$ of method $38a$, a frequency of a determination of the distance conversion parameter and/or a frequency of calibration movements of robot $10a$ carried out by control and/or regulating unit $18a$, for determining the distance conversion parameter, is set with the aid of external unit $48a$, in particular, via communications unit $42a$, and/or via operating unit $40a$ of robot $10a$. It is also possible for the frequency of a determination of the distance conversion parameter and/or the frequency of calibration movements of robot $10a$ executed by control and/or regulating unit $18a$, for determining the distance conversion parameter, to be set during initial operation of robot $10a$ and/or prior to a first determination of the distance conversion parameter. In a further method step $96a$ of method $38a$, the frequency of a determination of the distance conversion parameter and/or the frequency of calibration movements of robot $10a$ executed by control and/or regulating unit $18a$ for determining the distance conversion parameter is set with the aid of control and/or regulation unit $18a$ as a function of at least one surrounding-area parameter measured by a sensor unit $16a$ of robot $10a$. For example, when heavy rainfall is detected by sensor unit $16a$, in particular, by sensor element $54a$, a limiting value of the positional error parameter is adjusted, in particular, increased, preferably, in order to prevent overly frequent calibration movements of robot $10a$, due to poor visibility conditions; in particular, a necessary duration of normal operation, in particular, mowing operation, of robot $10a$ being able to be ensured.

In particular, other embodiments of method $38a$ are also possible; for example, the distance conversion parameter being determined continuously during normal operation.

Figure 5:
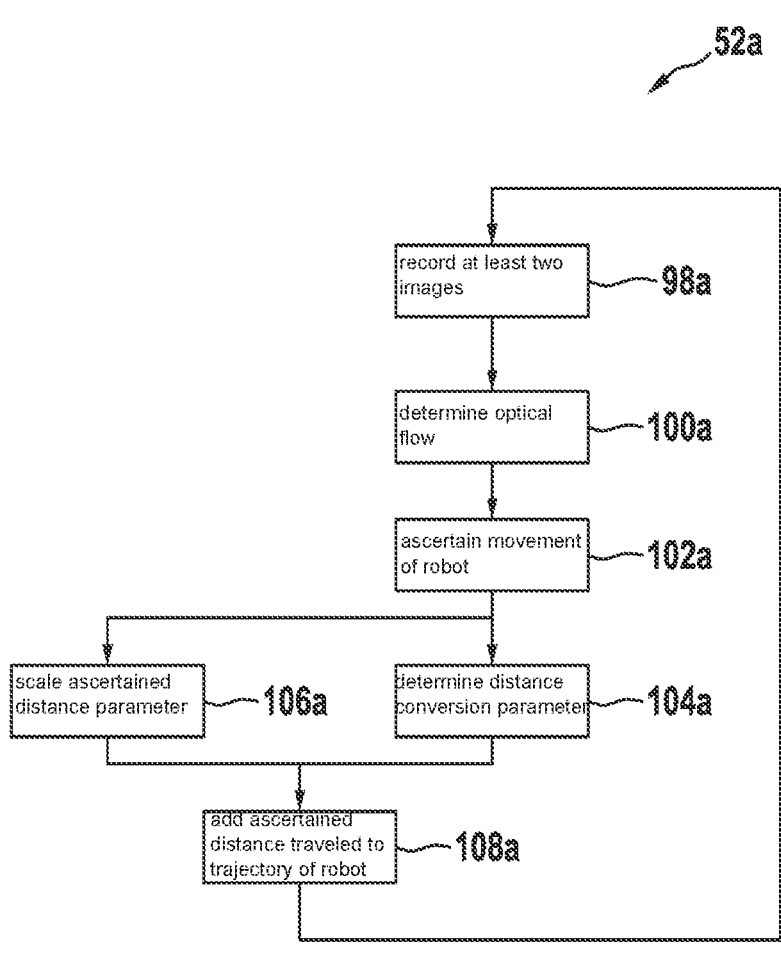
FIG. 5 shows a schematic representation of an algorithm for ascertaining the distance traveled by the robot of the present invention; the algorithm being executed by a control and/or regulating unit of the robot of the present invention.

An example of an embodiment of algorithm $52a$, which may be executed by control and/or regulating unit $18a$, and is provided, in particular, for determining the distance conversion parameter and for ascertaining the distance traveled $26a$ by robot $10a$, is shown in FIG. 5. In a first step $98a$ of algorithm $52a$, at least two images are preferably recorded temporally offset from each other, in particular, during a movement of robot $10a$, with the aid of capture unit $14a$, in particular, capture element $28a$. It is preferably possible for at least one of the two images to be recorded prior to or after a movement of the robot, or for one image of the two images to be recorded prior to a movement of robot $10a$ and another image of the two images to be recorded after the movement of robot $10a$. In particular, in a second step $100a$ of algorithm $52a$, an optical flow of the two recorded images is determined with the aid of capture unit $14a$ and/or control and/or regulating unit $18a$; in particular, differences between the two images being ascertained on the basis of changed pixels. Preferably, at least one point is ascertained, whose position has changed from a first of the two images to a second of the two images. In a third step $102a$ of algorithm $52a$, a movement of robot $10a$ between the two images is ascertained from the positions of the ascertained point in the two images and the known/stored position of capture unit $14a$, in particular, of capture element $28a$, using a method of epipolar geometry (see also FIG. 6). In particular, with the aid of control and/or regulating unit $18a$, a movement of robot $10a$ from the first image to the second image is ascertained as a function of a plurality of ascertained points of the two images and their optical flow; in particular, a distance parameter taking the form of a distance traveled $26a$ by robot $10a$ being ascertained. In particular, an angle of rotation $50a$ of capture unit $14a$, in particular, of capture element $28a$, is ascertained in third step $102a$. If the movement of robot $10a$ occurring between the two images is detected as/takes the form of at least essentially a calibration movement, then, in a fourth step $104a$ of algorithm $52a$, the distance conversion parameter is determined as a function of an ascertained angle of rotation $50a$ about rotational axis $24a$ and of the stored position of capture unit $14a$, in particular, of capture element $28a$, about rotational axis $24a$. In an alternative fourth step $106a$ of algorithm $52a$, if the movement of robot $10a$ occurring between the two images differs from a calibration movement and/or an angular movement of capture unit $14a$ about rotational axis $24a$, then the ascertained distance parameter of the movement is scaled with the aid of a distance conversion parameter determined beforehand and stored, in particular, in control and/or regulating unit $18a$; in particular, the distance parameter being converted to meters. In particular, the scaled distance parameter/distance parameter converted to meters takes the form of the distance traveled $26a$ by robot $10a$ between the two images, in particular, in meters. In particular, in alternative fourth step 106*a* of the algorithm, if the movement of robot 10*a* occurring between the two images differs from a calibration movement and/or from an angular movement of capture unit 14*a* about rotational axis 24*a*, then, with the aid of control and/or regulating unit 18*a*, preferably no distance conversion parameter is determined, or a distance conversion parameter determined over the two images is discarded. If robot 10*a* has not moved in a time interval between the two images, then, preferably, no further action of control and/or regulating unit 18*a* occurs; in particular, a further iteration of algorithm 52*a*, in particular, beginning with above-mentioned first step 98*a* of algorithm 52*a*, taking place immediately or in a time interval. In a fifth step 108*a* of algorithm 52*a*, ascertained distance traveled 26*a* by robot 10*a* is added to a trajectory of robot 10*a* ascertained beforehand, and/or a trajectory of robot 10*a* is generated from a starting point of robot 10*a*. In particular, in fifth step 108*a* or a sixth step of algorithm 52*a*, *a*, in particular, three-dimensional, virtual map is preferably generated and/or updated by control and/or regulating unit 18*a* as a function of an overall trajectory of robot 10*a*. It is possible for data, in particular, at least one surrounding-area parameter, of sensor unit 16*a* to be utilized for generating the trajectory and/or the virtual map. For example, in particular, in one embodiment of a sensor element of sensor unit 16*a* as a proximity sensor, a distance from objects 32*a* in the area surrounding robot 10*a* is utilized for generating the virtual map. Algorithm 52*a* is preferably executed periodically or continuously. In particular, after fifth/sixth step 108*a* of algorithm 52*a*, a further iteration of algorithm 52*a*, in particular, beginning with above-mentioned, first step 98*a* of algorithm 52*a*, takes place immediately or in a time interval. For example, in a next iteration of algorithm 52*a*, it is possible for the second image of the images recorded, in particular, in the first step, to be utilized, together with a further, recorded image, for a determination of the distance conversion parameter and/or for a determination of the distance traveled 26*a* by robot 10*a*; the further, recorded image being recorded, in particular, by capture unit 14*a*, temporally offset from the second image.

Figure 6:
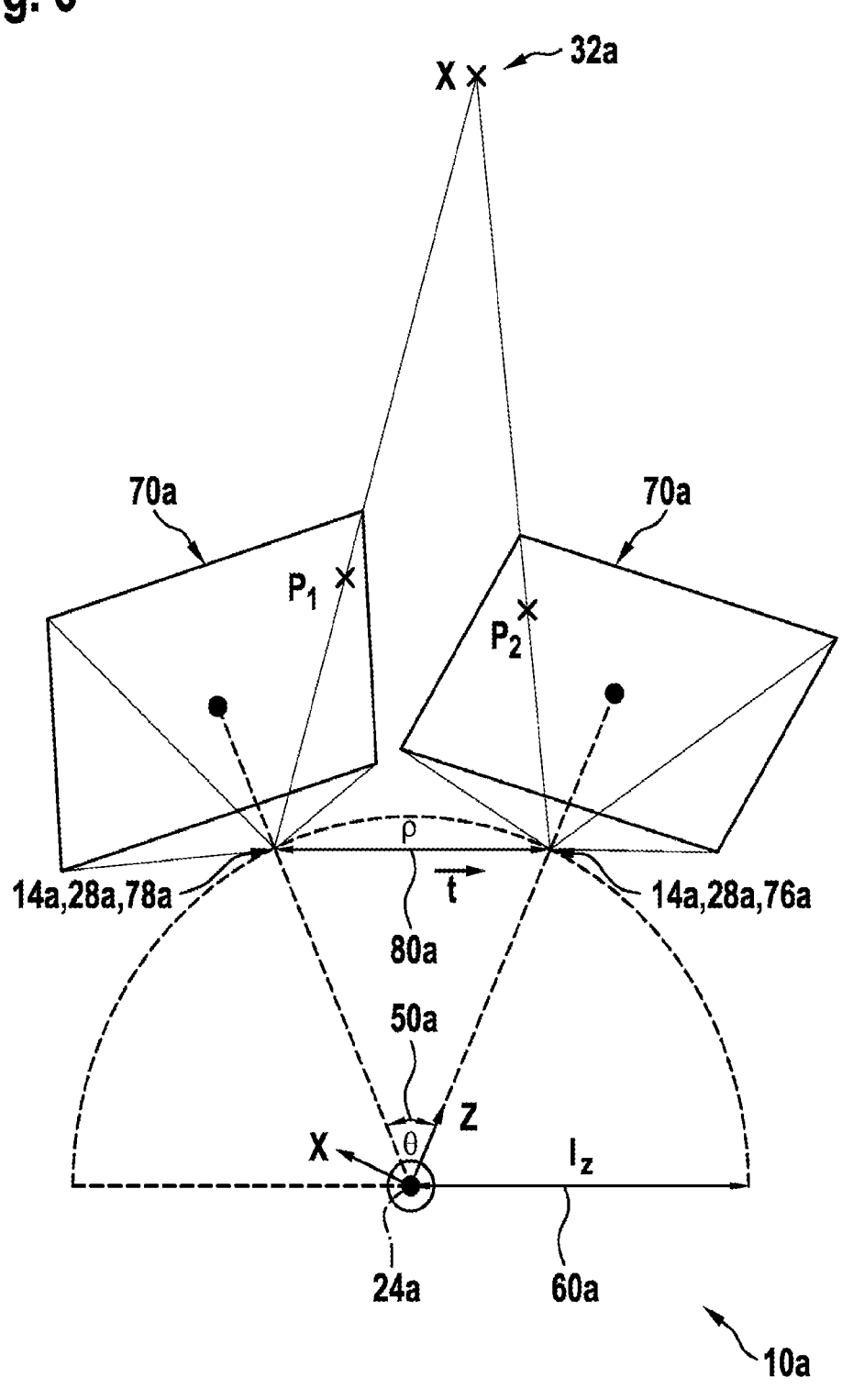
FIG. 6 shows an illustrative representation of a calibration movement; an angle of rotation moved through about a rotational axis of the calibration movement being ascertained.

An illustrative, abstracted representation of a calibration movement of robot 10*a*, including capture ranges 70*a* of capture unit 14*a* prior to the calibration movement and after the calibration movement, is shown in FIG. 6. In particular, the example shown in FIG. 6 is intended to clarify a method of epipolar geometry for ascertaining the angle of rotation 50*a*, which is moved through by capture unit 14*a* during the calibration movement and is also referred to, in particular, in FIG. 6 and the subsequent description, as θ. The movement of capture unit 14*a*, in particular, of capture element 28*a*, during the calibration movement may be described, in particular, in an idealized manner, by the vector t, where $$t = \rho \cdot \begin{bmatrix} \sin\frac{\theta}{2} \\ 0 \\ \cos\frac{\theta}{2} \end{bmatrix}. \tag{1}$$

The rotation of capture unit 14*a*, in particular, of capture element 28*a*, during the calibration movement may be described by rotation matrix R, where $$R = \begin{bmatrix} \cos\theta & 0 & \sin\theta \\ 0 & 1 & 0 \\ -\sin\theta & 0 & \cos\theta \end{bmatrix} \tag{2}$$

since, in particular, the movement of capture unit 14*a*, in particular, of capture element 28*a*, takes place within a plane, which extends, in particular, perpendicularly to rotational axis 24*a*.

The images utilized for determining the distance conversion parameter are recorded in two different positions 62*a*, 64*a* of capture unit 14*a* relative to rotational axis 24*a*, which means that the equation of the essential matrix is $$E = [T]_x R \tag{3}$$

where $[T]_x$, in the form of a skew-symmetric matrix of vector t, is given by $$[T]_x = \begin{bmatrix} 0 & -t_z & t_y \\ t_z & 0 & -t_x \\ -t_y & t_x & 0 \end{bmatrix}. \tag{4}$$

Capture unit 14*a*, in particular, capture element 28*a*, and control and/or regulating unit 18*a* are designed to ascertain angle of rotation 50*a* over a movement of at least one considered point X relative to capture ranges 70*a* and/or the main viewing direction, in particular, over a position of point X in the recorded images. For example, point X takes the form of a corner of an object 32*a* or another reference point, detectable by capture unit 14*a*, in the area surrounding robot 10*a*. In particular, capture unit 14*a* is intended for a point-based feature tracking method; in particular, at least one point X from a recorded image being ascertained. Pixels of the viewed point X in the global coordinate system are given as a function of the image, by the equation $$P_i = [x_i y_i z_i]T \tag{5}$$

Using the equation of the epipolar line from epipolar geometry $$P_2^T E P_1 = 0 \tag{6}$$

the following results from equations (2), (3), (4), (5), together with equation (6):

$$\alpha \cdot \sin\theta + b \cdot \cos\theta = c \tag{7}$$

where the constants a, b, and c are yielded from the values used, in particular, from R and t, and are not specified here in detail, in particular, for the sake of clarity. Angle of rotation θ (50*a*) for the calibration movement may be calculated from equation (7) as follows:

$$\theta = 2n\pi \pm \cos^{-1}\frac{c}{\sqrt{a^2 + b^2}} + \tan^{-1}\frac{a}{b}. \tag{8}$$

In particular, an error in the angle of rotation θ (50*a*) ascertained in this manner from the at least two images by control and/or regulating unit 18*a* is essentially at least $0.5 \cdot 10\text{-}9°$ to $3 \cdot 10\text{-}9°$. The distance conversion parameter, which takes the form of a distance 80*a* of position 76*a* of capture unit 14*a*, in particular, of capture element 28*a*, prior to the calibration movement, in particular, at a capture point of the one image utilized for ascertaining angle of rotation 50*a*, and a distance of further position 78*a* of capture unit 14*a*, in particular, of capture element 28*a*, after the calibration movement, in particular, at a capture point of the further image utilized for ascertaining angle of rotation 50*a*, is determined with the aid of control and/or regulating unit 18a, using the trigonometric equation $$\rho = 2 \cdot l_z \cdot \sin\frac{\theta}{2} \qquad (9)$$

where, in particular, $l_z$ is the minimum distance of capture unit 14a, in particular, of capture element 28a, from the plane spanned by rotational axis 24a and axis of rotation 36a of the two locomotion devices 22a (cf. FIGS. 2A and 2B). It is also possible for the distance conversion parameter to be determined analogously for other placements of capture unit 14a, in particular, of capture element 28a; in particular, in equation (8), a minimum distance from capture unit 14a, in particular, from capture element 28a, to rotational axis 24a being used.

In FIGS. 1 through 6, method 38a, that is, the algorithm 52a for ascertaining the distance traveled 26a by a robot 10a is described for a robot 10a taking the form of a mobile mowing robot 10a. Such a method 38a and/or such an algorithm 52a, is/are possible for all types of mobile robots, independently of a type of movement, which are, in particular, intended for a movement about a fixed rotational axis, at a known distance, within a plane oriented, in particular, perpendicularly to the rotational axis, and which include, in each instance, a capture unit that is set apart from the rotational axis. For example, robots capable of floating, flying (see FIGS. 7 and 8), submerging, and/or hovering are possible; with the aid of a control and/or regulating unit of the robot, a distance traveled by the robot being ascertained, using a distance conversion parameter determined, in particular, during a calibration movement of the robot.

Figure 7:
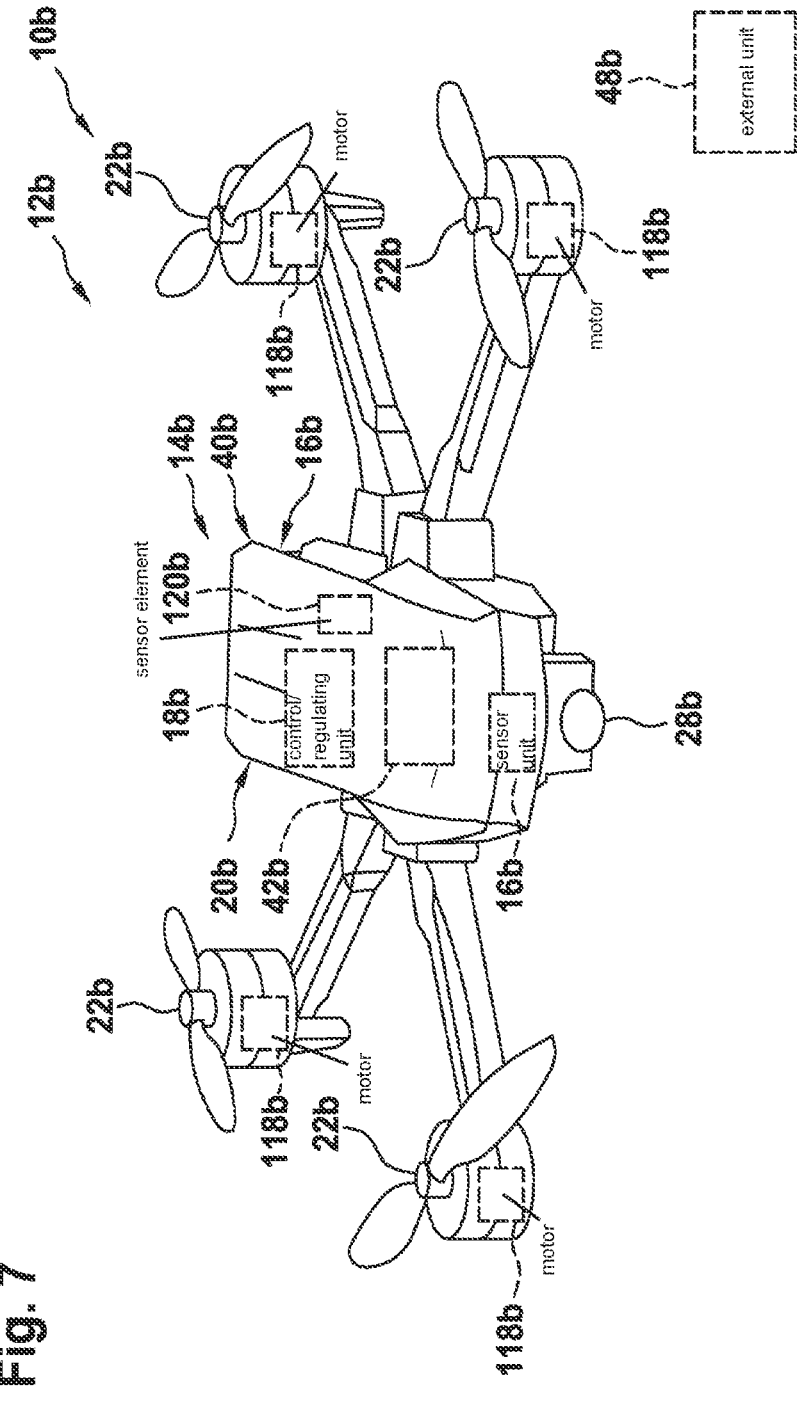
FIG. 7 shows a perspective view of an alternative embodiment of a robot of the present invention, for performing a method of the present invention of ascertaining a distance traveled by the robot; the robot taking the form of a drone capable of flying.
Figure 8:
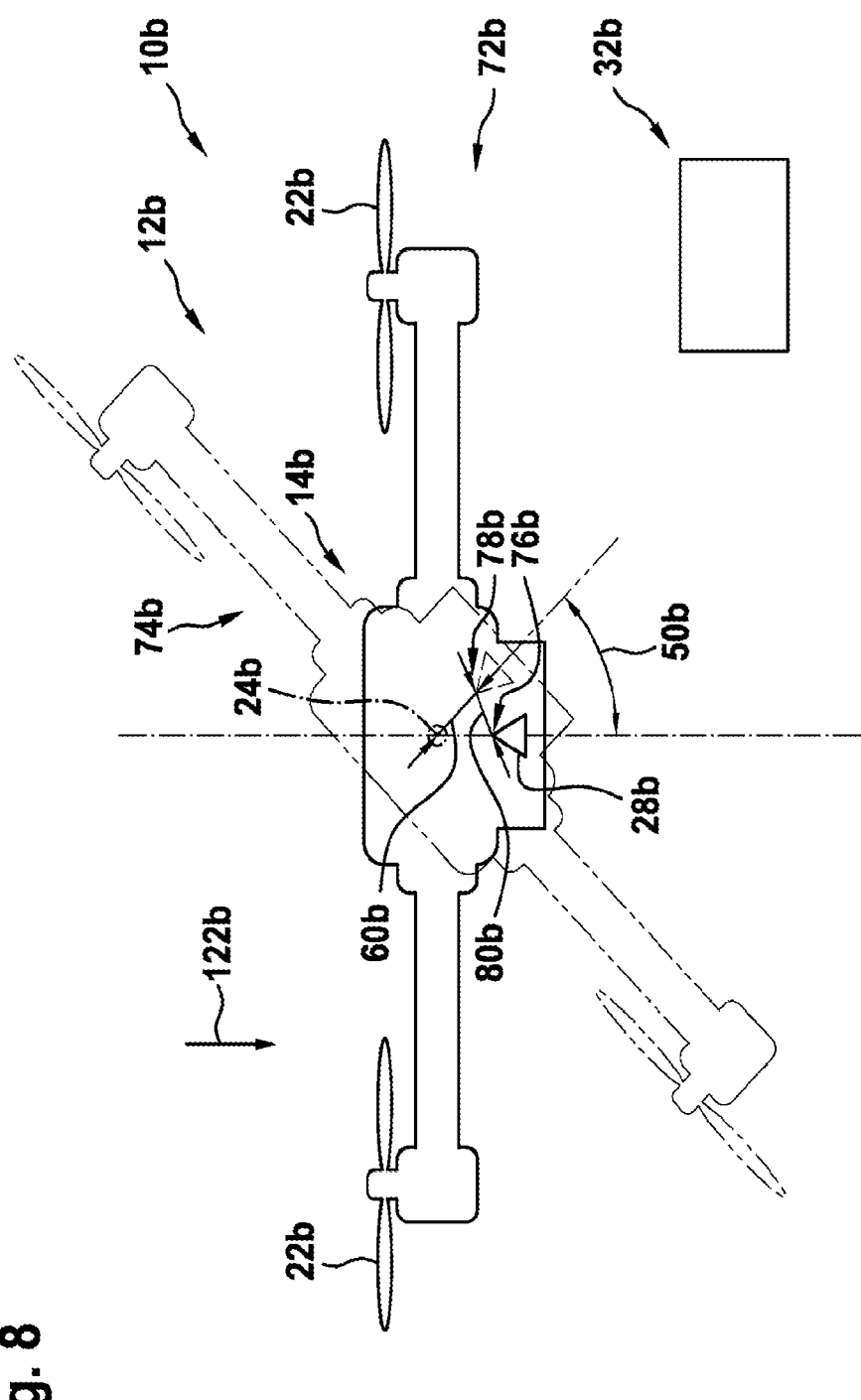
FIG. 8 shows a schematic representation of an illustrative calibration movement of the alternative embodiment of the robot of the present invention, about a rotational axis, which runs horizontally.

A further exemplary embodiment of the present invention is shown in FIGS. 7 and 8. The following descriptions and the figures are limited mainly to the differences between the exemplary embodiments; with regard to identically designated components, in particular, with regard to components having the same reference characters, reference also being able to be made, in principle, to the figures and/or the description of the other exemplary embodiment, in particular, of FIGS. 1 through 6. In order to distinguish between the exemplary embodiments, the letter "a" follows the reference numerals of the exemplary embodiment in FIGS. 1 through 6. In the exemplary embodiment of FIGS. 7 and 8, the letter "a" is replaced by the letter "b."

An alternative embodiment of a semiautonomous robot 10b is shown in FIG. 7. The robot 10b represented in FIGS. 7 and 8 has a form at least substantially analogous to the robot 10a described in the description of FIGS. 1 through 6, which means that regarding an embodiment of the robot 10b represented in FIGS. 7 and 8, reference may be made at least substantially to the description of FIGS. 1 through 6. In contrast to the robot 10a described in the description of FIGS. 1 through 6, the robot 10b shown in FIGS. 7 and 8 preferably takes the form of a drone capable of flying. Robot 10b includes four powered locomotion devices 22b taking the form of rotors, a monocular capture unit 14b, and a control and/or regulating unit 18b for ascertaining a distance traveled 26b by robot 10b. The four locomotion devices 22b of robot 10b are designed to rotate at least capture unit 14b about a rotational axis 24b (cf. FIG. 8), which is situated in a fixed position relative to capture unit 14b; capture unit 14b and rotational axis 24b being set apart from each other. As a function of a movement of capture unit 14b about the rotational axis 24b fixed during the movement, in particular, at a known distance 60b from rotational axis 24b and/or in a known orientation relative to rotational axis 24b, control and/or regulating unit 18b is configured to determine a distance conversion parameter, which is provided for ascertaining distance traveled 26b by robot 10b. Robot 10b, in particular, control and/or regulating unit 18b, is preferably designed to execute a method 38b for ascertaining a distance traveled 26b by robot 10b; the method being, in particular, at least substantially analogous to the method 38a described with regard to FIG. 4. Robot 10b preferably includes a steering and/or drive unit 12b; in particular, locomotion devices 22a taking the form of a part of steering and/or drive unit 12b. Steering and/or drive unit 12b includes four electric motors 118b, which are each provided for a drive unit of one of locomotion devices 22b. Preferably, the four locomotion devices 22b may be driven differentially, in particular, by motors 118b. In order to determine the distance conversion parameter, control and/or regulating unit 18b is configured to set at least one steering and/or drive parameter of steering and/or drive unit 12b, in particular, of motors 118b or individual motors 118b, to perform a calibration movement. Alternatively, or in addition, it is possible for control and/or regulating unit 18b to be configured to determine the distance conversion parameter during normal operation of robot 10b, in particular, continuously, periodically, or if a movement of robot 10b between two recorded images utilized by capture unit 14b for determining the distance conversion parameter, remains within an extreme range of movement. In particular, control and/or regulating unit 18b is configured to ascertain a, in particular, view-specific distance parameter with the aid of an evaluation of two images recorded temporally offset from each other, by capture unit 14b, and to scale the ascertained distance parameter over the determined distance conversion parameter, in order to ascertain the distance traveled 26b, in particular, between two capture times of the two images. Control and/or regulating unit 18b preferably includes at least one algorithm 52b for determining the distance conversion parameter and for ascertaining the distance traveled 26b by robot 10b, in particular, with the aid of the distance conversion parameter. In particular, algorithm 52b is at least substantially analogous to the algorithm 52a described with regard to FIG. 5. In addition, it is possible for robot 10b to include a sensor unit 16b for measuring at least one surrounding-area parameter. In particular, a sensor element 120b of sensor unit 16b takes the form of a wind sensor, a position sensor, an inertial sensor, or the like.

An example of a calibration movement of robot 10b for determining the distance conversion parameter is shown in FIG. 8. In particular, robot 10b is shown in a position 72b prior to the calibration movement and a position 74b after the calibration movement. Rotational axis 24b preferably runs through robot 10b. However, during the calibration movement/during a movement to determine the distance conversion parameter, it is also possible for robot 10b, in particular, locomotion devices 22b, to be designed to move robot 10b about a rotational axis 24b spaced apart from robot 10b;

in particular, monocular capture unit 14b being at a known, constant distance 60b from rotational axis 24b; the distance being, in particular, in a plane of the calibration movement/movement; and the monocular capture unit having a known orientation relative to rotational axis 24b. In the example shown in FIG. 8, rotational axis 24b is oriented at least substantially parallelly to a longitudinal extension of robot 10b and/or to a horizontal and includes a major axis of robot 10b. However, other forms of the calibration movement of robot 10b are also possible, for example, at least substantially parallel to a vertical direction 122b, at least substantially perpendicular to a vertical direction 122b and to the major axis of robot 10b, or the like. In particular, it is possible for the calibration movement to be performed with the aid of control and/or regulating unit 18b in such a manner, that rotational axis 24b is oriented as a function of an area surrounding robot 10b and/or as a function of objects 32b in the area surrounding robot 10b. For example, the area surrounding robot 10b and/or objects 32b in the area surrounding robot 10b are monitored by capture unit 14b and/or sensor unit 16b, and a calibration movement for a collision-free determination of the distance conversion parameter is ascertained with the aid of control and/or regulating unit 18b. Alternatively, or in addition, it is possible for the calibration movement, in particular, with regard to an orientation of rotational axis 24b, to be ascertained by control and/or regulating unit 18b as a function of another surrounding-area parameter, for example, a wind velocity and/or a wind direction, and/or as a function of an action of robot 10b.

Alternatively, or in addition, it is possible for the distance conversion parameter to be determined with the aid of control and/or regulating unit 18b, in particular, using a calibration movement, at a start or at an end of an at least partially horizontal movement of robot 10b, in particular, during normal operation of robot 10b; robot 10b being inclined, in particular, about a rotational axis oriented horizontally (not shown in FIG. 8), which is oriented at least substantially perpendicularly to a direction of movement of the horizontal movement. For example, robot 10b is designed to tilt about such a rotational axis during an at least partially horizontal movement, in order to generate an, in particular, at least partially horizontally directed forward or reverse thrust, using the locomotion devices 22b of robot 10b taking the form, for example, of rotors pointing upwards. This may eliminate, in particular, additional calibration movements between regular operation of robot 10b for determining the distance conversion parameter. A movement of the robot at a start or an end of the at least partially horizontal movement is preferably compared to at least one stored extreme range of movement with the aid of control and/or regulating unit 18b. If, for example, between two images recorded at the start or the end of the horizontal movement, robot 10b does not exceed a predefined path of movement covered, in particular, translationally, and moves at least partially about the rotational axis, in particular, within a plane, then the distance conversion parameter is determined over the two recorded images with the aid of control and/or regulating unit 18b. In particular, if the movement of robot 10b occurring between the two images lies outside of the extreme range of movement, then no distance conversion parameter is determined over the two recorded images, or a distance conversion parameter determined over the two recorded images is discarded.

What is claimed is:

1. A semiautonomous robot, comprising:
at least two powered locomotion devices;
a monocular capture unit; and
a control system including at least one control unit, wherein the control system is configured to:
during operation of the semiautonomous robot, intermittently:
control the at least two locomotion devices to perform a same predefined calibration maneuver that includes rotating the capture unit along a predefined rotational motion path about a rotational axis having a predefined and fixed geometric offset from the capture unit, the predefined and fixed geometric offset including a predefined distance and orientation relative to the capture unit;
control the capture unit to obtain calibration images at multiple positions along the performed calibration maneuver; and
determine a respective updated distance conversion parameter as a function of (1) the predefined rotational motion of the capture unit about the rotational axis and (2) an image motion between the obtained calibration images; and
ascertain a distance traveled by the semiautonomous robot based on (1) measurement images obtained by the monocular capture unit and (2) one of the determined respective distance conversion parameters.

2. The robot as recited in claim 1, wherein the at least two locomotion devices are wheels.

3. The robot as recited in claim 1, wherein the at least two powered locomotion devices are positioned coaxially to each other and are differentially drivable, the rotational axis intersecting a common axis of rotation of the two locomotion devices at least substantially at a midpoint of the axis of rotation, and being positioned at least substantially perpendicularly to a horizontal.

4. The robot as recited in claim 1, further comprising:
at least one steering and/or drive unit configured for moving the robot, the control system being configured to set at least one steering and/or drive parameter of the steering and/or drive unit for the determination of the respective updated distance conversion parameter.

5. The robot as recited in claim 1, wherein the control system includes at least one algorithm for performing the calibration maneuver for obtaining the respective updated distance conversion parameter continuously or periodically, during normal operation of the robot.

6. The robot as recited in claim 1, wherein the updated distance conversion parameter includes a scaling factor for converting image pixel measurements into a distance metric.

7. The robot as recite in claim 1, wherein the control system is configured to selectively use a most recently determined one of the respective distance conversion parameters as the distance conversion parameter on which the ascertainment of the distance traveled is based.

8. The robot as recited in claim 7, wherein the control system is configured to ascertain a view-specific distance parameter using an evaluation of two measurement images recorded, temporally offset from each other, by the capture unit, and to scale the ascertained distance parameter using the most recently determined one of the respective distance conversion parameters, to ascertain a distance traveled between two capture times of the two measurement images.

9. A method for a semiautonomous robot, the robot including at least two powered locomotion devices and a monocular capture unit, the method comprising the following steps:
during operation of the semiautonomous robot, intermittently:
controlling the at least two locomotion devices to perform a same predefined calibration maneuver that includes rotating the capture unit along a predefined rotational motion path about a rotational axis having a predefined and fixed geometric offset from the capture unit, the predefined and fixed geometric offset including a predefined distance and orientation relative to the capture unit;

controlling the capture unit to obtain calibration images at multiple positions along the performed calibration maneuver; and determining a respective updated distance conversion parameter as a function of (1) the predefined rotational motion of the capture unit about the rotational axis and (2) an image motion between the obtained calibration images; and; and ascertaining a distance traveled by the semiautonomous robot based on (1) measurement images obtained by the monocular capture unit and (2) one of the determined respective distance conversion parameters.

10. The method as recited in claim 9, wherein the at least two locomotion devices are wheels.

11. The method as recited in claim 9, wherein the distance conversion parameter is determined continuously or periodically, in each instance, over a time interval, by a control system executing an algorithm, and wherein, as a function of a movement of the robot, which takes place within the time interval, a determined value of the distance conversion parameter either is utilized for ascertaining the distance traveled or is discarded.

12. The method as recited in claim 9, wherein the calibration maneuver is performed by a control system controlling a steering and/or drive unit of the robot.

13. The method as recited in claim 12, wherein, in a determination of a distance traveled by the robot within a time interval, at least one positional error parameter of the robot is ascertained as a function of an error in an ascertained distance parameter of the robot, as a function of an error in the distance conversion parameter utilized for ascertaining the distance traveled, and/or as a function of a positional error parameter of the robot ascertained for a distance traveled within a previous time interval.

14. The method as recited in claim 13, wherein, in response to an exceedance of a limiting value of the ascertained positional error parameter, at least one calibration movement of the robot for determining the distance conversion parameter is executed using the steering and/or drive unit.

15. The method as recited in claim 14, wherein a frequency of a determination of the distance conversion parameter and/or a frequency of the calibration maneuver of the robot for determining the distance conversion parameter, is set using an external unit and/or an operating unit of the robot.

16. The method as recited in claim 14, wherein a frequency of a determination of the distance conversion parameter and/or a frequency of the calibration maneuver of the robot for determining the distance conversion parameter is set as a function of at least one surrounding-area parameter measured by a sensor unit of the robot.

17. The method as recited in claim 13, wherein the calibration maneuver for determining the distance conversion parameter includes rotating at least the capture unit about the rotational axis, and wherein a maximum angle of rotation of the calibration maneuver is as a function of an image evaluation parameter ascertained relative to an image captured prior to or at a start of the calibration maneuver.

18. The method as recited in claim 9, wherein, prior to initial operation of the robot, at least one position of the capture unit relative to the rotational axis is determined with the aid of a user and/or with the aid of an external unit and/or with the aid of a control and/or regulating unit, and stored in a storage unit of the control and/or regulating unit for determining the distance conversion parameter.

* * * * *